United States Patent
Zhang et al.

(10) Patent No.: US 12,189,777 B2
(45) Date of Patent: Jan. 7, 2025

(54) SECURE BOOT SYSTEMS AND METHODS FOR PROGRAMMABLE LOGIC DEVICES

(71) Applicant: Lattice Semiconductor Corporation, Hillsboro, OR (US)

(72) Inventors: Fulong Zhang, Cupertino, CA (US); Srirama Chandra, Portland, OR (US); Sreepada Hegade, San Jose, CA (US); Joel Coplen, Portland, OR (US); Wei Han, Portland, OR (US); Yu Sun, Shanghai (CN)

(73) Assignee: Lattice Semiconductor Corporation, Hillsboro, OR (US)

( * ) Notice: Subject to any disclaimer, the term of this patent is extended or adjusted under 35 U.S.C. 154(b) by 650 days.

(21) Appl. No.: 17/093,582

(22) Filed: Nov. 9, 2020

(65) Prior Publication Data
US 2021/0081536 A1    Mar. 18, 2021

Related U.S. Application Data

(63) Continuation of application No. PCT/US2019/031886, filed on May 10, 2019.
(Continued)

(51) Int. Cl.
*G06F 9/00* (2018.01)
*G06F 8/65* (2018.01)
(Continued)

(52) U.S. Cl.
CPC .............. *G06F 21/575* (2013.01); *G06F 8/65* (2013.01); *G06F 9/44505* (2013.01);
(Continued)

(58) Field of Classification Search
CPC ...... G06F 21/572; G06F 21/575; G06F 21/76; H04L 9/30; H04L 9/3236; H04L 9/3252
See application file for complete search history.

(56) References Cited

U.S. PATENT DOCUMENTS

| | | | |
|---|---|---|---|
| 5,425,036 | A | 6/1995 | Liu et al. |
| 5,838,901 | A | 11/1998 | Curd et al. |

(Continued)

FOREIGN PATENT DOCUMENTS

| | | |
|---|---|---|
| EP | 1124330 | 8/2001 |
| EP | 2056231 | 5/2009 |

(Continued)

OTHER PUBLICATIONS

European Patent Application No. 19799989.9 filed Dec. 11, 2020.
(Continued)

*Primary Examiner* — Mohammed H Rehman
(74) *Attorney, Agent, or Firm* — Haynes and Boone, LLP

(57) ABSTRACT

Systems and methods for secure booting of secure programmable logic devices (PLDs) are disclosed. An example system includes a secure PLD including programmable logic blocks (PLBs) arranged in a PLD fabric of the secure PLD, and a configuration engine configured to program the PLD fabric according to a configuration image stored in a non-volatile memory (NVM) of the secure PLD and/or coupled through a configuration input/output (I/O) of the secure PLD to the configuration engine. The secure PLD is configured to retrieve a pre-authentication status associated with the configuration image from the NVM, determine or verify the retrieved pre-authentication status associated with the configuration image includes a valid status, and boot the PLD fabric of the secure PLD using the configuration image.

21 Claims, 18 Drawing Sheets

Related U.S. Application Data

(60) Provisional application No. 62/846,365, filed on May 10, 2019, provisional application No. 62/756,001, filed on Nov. 5, 2018, provisional application No. 62/756,015, filed on Nov. 5, 2018, provisional application No. 62/756,021, filed on Nov. 5, 2018, provisional application No. 62/670,487, filed on May 11, 2018.

(51) Int. Cl.

| | | |
|---|---|---|
| *G06F 9/445* | (2018.01) | |
| *G06F 11/36* | (2006.01) | |
| *G06F 12/02* | (2006.01) | |
| *G06F 15/177* | (2006.01) | |
| *G06F 21/31* | (2013.01) | |
| *G06F 21/44* | (2013.01) | |
| *G06F 21/57* | (2013.01) | |
| *G06F 21/76* | (2013.01) | |
| *G06F 21/79* | (2013.01) | |
| *G06F 21/85* | (2013.01) | |
| *H03K 19/17768* | (2020.01) | |
| *H04L 9/08* | (2006.01) | |
| *H04L 9/30* | (2006.01) | |
| *H04L 9/32* | (2006.01) | |
| *G06F 21/10* | (2013.01) | |

(52) U.S. Cl.
CPC ...... *G06F 11/3656* (2013.01); *G06F 12/0246* (2013.01); *G06F 21/31* (2013.01); *G06F 21/44* (2013.01); *G06F 21/572* (2013.01); *G06F 21/577* (2013.01); *G06F 21/76* (2013.01); *G06F 21/79* (2013.01); *G06F 21/85* (2013.01); *H03K 19/17768* (2013.01); *H04L 9/0825* (2013.01); *H04L 9/085* (2013.01); *H04L 9/0877* (2013.01); *H04L 9/30* (2013.01); *H04L 9/3236* (2013.01); *H04L 9/3252* (2013.01); *G06F 21/107* (2023.08); *H04L 2209/12* (2013.01)

(56) References Cited

U.S. PATENT DOCUMENTS

| | | | |
|---|---|---|---|
| 5,991,880 A | 11/1999 | Curd et al. | |
| 6,357,037 B1 | 3/2002 | Burnham et al. | |
| 6,904,527 B1 | 6/2005 | Parlour et al. | |
| 6,996,713 B1 | 2/2006 | Trimberger | |
| 7,047,352 B1 | 5/2006 | Khu et al. | |
| 7,162,644 B1 | 1/2007 | Trimberger | |
| 7,197,647 B1 | 3/2007 | Van Essen et al. | |
| 7,203,842 B2 | 4/2007 | Kean | |
| 7,339,400 B1 | 4/2008 | Walstrum, Jr. et al. | |
| 7,624,432 B2 | 11/2009 | Wood | |
| 7,716,497 B1 | 5/2010 | Trimberger | |
| 7,725,738 B1 | 5/2010 | Langhammer et al. | |
| 7,759,968 B1 | 7/2010 | Hussein et al. | |
| 7,834,652 B1 | 11/2010 | Tang et al. | |
| 7,877,461 B1 | 1/2011 | Rimmer | |
| 7,971,072 B1 | 6/2011 | Donlin et al. | |
| 8,516,268 B2 | 8/2013 | Woodall | |
| 8,621,597 B1 | 12/2013 | Jenkins, IV | |
| 8,843,764 B2 | 9/2014 | Hussain | |
| 8,898,480 B2 | 11/2014 | LaMacchia et al. | |
| 9,165,143 B1 | 10/2015 | Sanders et al. | |
| 9,230,091 B2 | 1/2016 | LaMacchia et al. | |
| 9,230,112 B1 | 1/2016 | Peterson et al. | |
| 9,305,185 B1 | 4/2016 | Pederson | |
| 9,424,019 B2 | 8/2016 | Nightingale et al. | |
| 9,454,526 B1* | 9/2016 | Kapoor | G06F 21/32 |
| 9,600,291 B1* | 3/2017 | Atsatt | G06F 21/6218 |
| 9,672,281 B1* | 6/2017 | Kapoor | G06F 8/63 |
| 9,792,154 B2 | 10/2017 | Burger et al. | |
| 9,819,542 B2 | 11/2017 | Burger | |
| 9,847,980 B2 | 12/2017 | Burger et al. | |
| 9,911,010 B2 | 3/2018 | Woodall | |
| 10,216,555 B2 | 2/2019 | Chiou et al. | |
| 10,270,709 B2 | 4/2019 | Burger et al. | |
| 10,296,392 B2 | 5/2019 | Heil et al. | |
| 10,419,493 B2 | 9/2019 | Barday | |
| 2003/0046607 A1 | 3/2003 | May et al. | |
| 2005/0081118 A1 | 4/2005 | Cheston et al. | |
| 2006/0080172 A1 | 4/2006 | Najarian et al. | |
| 2006/0294103 A1 | 12/2006 | Wood | |
| 2007/0021843 A1 | 1/2007 | Neill et al. | |
| 2007/0198892 A1 | 8/2007 | Ng et al. | |
| 2007/0204170 A1 | 8/2007 | Oren et al. | |
| 2007/0282951 A1 | 12/2007 | Slimis et al. | |
| 2007/0288765 A1 | 12/2007 | Kean | |
| 2009/0006852 A1 | 1/2009 | Qiu et al. | |
| 2009/0060197 A1 | 3/2009 | Taylor et al. | |
| 2009/0280774 A1 | 11/2009 | Patel et al. | |
| 2009/0300758 A1 | 12/2009 | Hauck et al. | |
| 2011/0063093 A1 | 3/2011 | Fung et al. | |
| 2013/0145140 A1 | 6/2013 | Hsien | |
| 2013/0346758 A1 | 12/2013 | LaMacchia et al. | |
| 2014/0043059 A1 | 2/2014 | Speers et al. | |
| 2014/0344581 A1 | 11/2014 | Grieco et al. | |
| 2015/0199520 A1 | 7/2015 | Woolley et al. | |
| 2015/0326540 A1 | 11/2015 | Hamburg et al. | |
| 2015/0326567 A1 | 11/2015 | Hamburg et al. | |
| 2016/0011878 A1* | 1/2016 | Chandra | G06F 12/0246 711/103 |
| 2016/0026826 A1 | 1/2016 | Kocher et al. | |
| 2016/0072629 A1 | 3/2016 | Kulkarni | |
| 2016/0125187 A1 | 5/2016 | Oxford | |
| 2016/0217021 A1 | 7/2016 | Wang | |
| 2017/0147356 A1* | 5/2017 | Kotary | G06F 21/72 |
| 2017/0222869 A1 | 8/2017 | Guo et al. | |
| 2018/0082083 A1 | 3/2018 | Smith et al. | |
| 2018/0189081 A1* | 7/2018 | Upasani | G06F 9/4401 |
| 2021/0081536 A1* | 3/2021 | Zhang | H04L 9/30 |

FOREIGN PATENT DOCUMENTS

| | | |
|---|---|---|
| EP | 2341457 | 7/2011 |
| JP | 2015-507234 | 12/2014 |
| WO | WO200049717 | 8/2000 |
| WO | WO2003023616 A2 | 3/2003 |
| WO | WO2017161305 | 9/2017 |

OTHER PUBLICATIONS

European Patent Application No. 19800359.2 filed Dec. 11, 2020.
European Patent Application No. 19799852.9 filed Dec. 11, 2020.
European Patent Application No. 19799077.3 filed Dec. 11, 2020.
International Patent Application No. PCT/US2019/031883 filed May 10, 2019.
International Patent Application No. PCT/US2019/031881 filed May 10, 2019.
International Patent Application No. PCT/US2019/031886 filed May 10, 2019.
International Patent Application No. PCT/US2019/031875 filed May 10, 2019.
U.S. Patent Application Publication No. 2021/0081577.
U.S. Patent Application Publication No. 2021/0083675.
U.S. Patent Application Publication No. 2021/0081578.

* cited by examiner

| | Group | | | Local | | External bus | | | Internal bus | | |
|---|---|---|---|---|---|---|---|---|---|---|---|
| HLOCK | READ | ERASE | READ | PROG | READ | PROG | ERASE | READ | PROG | ERASE |
| No Security | 0 | 0 | 0 | 0 | 0 | Y | Y | Y | Y | Y | Y |
| Soft Lock | 0 | 1 | 0 | 1 | 1 | Y | N | Y | Y | N | Y |
| | 1 | 1 | 1 | 1 | 1 | N | N | N | N | N | Y |
| Hard Lock | 1 | 1 | 0 | 1 | 0 | N | Y | Y | N | Y | Y |
| | 1 | 1 | 1 | 1 | 1 | N | N | N | N | N | Y |
| | 1 | 1 | 1 | 1 | 1 | N | N | N | N | N | N |

Legend:
- Y  Accessible
- Y  Accessible, fabric alterable
- N  Not accessible, fabric alterable
- N  Not accessible

- May be Altered by fabric
- Cannot be Altered by fabric

FIG. 9A  902

| | Group | | | Local | | External bus | | | Internal bus | | |
|---|---|---|---|---|---|---|---|---|---|---|---|
| HLOCK | READ | ERASE | READ | PROG | READ | PROG | ERASE | READ | PROG | ERASE |
| No Security | 0 | 0 | 0 | 0 | 0 | Y | Y | Y | Y | Y | Y |
| Soft Lock | 0 | 1 | 0 | 1 | 1 | Y | N | Y | Y | Y | Y |
| | 1 | 1 | 1 | 1 | 1 | N | N | N | N | Y | Y |
| Hard Lock | 1 | 1 | 0 | 1 | 0 | N | Y | Y | N | N | Y |
| | 1 | 1 | 1 | 1 | 1 | N | N | N | N | N | Y |
| | 1 | 1 | 1 | 1 | 1 | N | N | N | N | N | N |

Legend:
- Y  Accessable
- Y  Accessible, fabric alterable
- N  Not accessible, fabric alterable
- N  Not accessible

- May be altered by fabric
- Cannot be Altered by fabric

| | HLOCK | Group | | | External bus | | | Internal bus | | |
|---|---|---|---|---|---|---|---|---|---|---|
| | | WB | READ | ERASE | READ | PROG | ERASE | READ | PROG | ERASE |

*(Table 906 — combined Group/Local/External bus/Internal bus access matrix)*

FIG. 9D

| | Policy # | WB | HLOCK | Local | | | External Bus | | | Internal Bus | | |
|---|---|---|---|---|---|---|---|---|---|---|---|---|
| | | | | READ | PROG | ERASE | READ | PROG | ERASE | READ | PROG | ERASE |
| NO Security | 0 | X | 0 | 0 | 0 | 0 | Y | Y | Y | Y | Y | Y |
| Soft | 1 | 0 | 0 | 1 | 0 | 0 | N | Y | Y | Y | Y | Y |
| External Lock | 2 | 0 | 0 | 1 | 1 | 0 | N | N | Y | Y | Y | Y |
| | 3 | 0 | 0 | 1 | 1 | 1 | N | N | N | Y | Y | Y |
| Hard | 4 | 0 | 1 | 1 | 0 | 0 | N | Y | Y | Y | Y | Y |
| External Lock | 5 | 0 | 1 | 1 | 1 | 0 | N | N | Y | Y | Y | Y |
| | 6 | 0 | 1 | 1 | 1 | 1 | N | N | N | Y | Y | Y |
| Total | 7 | 1 | X | 1 | 1 | 0 | N | N | Y | Y | N | Y |
| Hard Lock | 8 | 1 | X | 1 | 0 | 0 | N | Y | Y | Y | N | Y |
| | 9 | 1 | X | 1 | 1 | 1 | N | N | N | N | N | N |

Legend:
- Y Accessible
- Y Accessible, fabric alterable
- N Not accessible, fabric alterable
- N Not accessible
- May be altered by fabric
- Cannot be altered by fabric

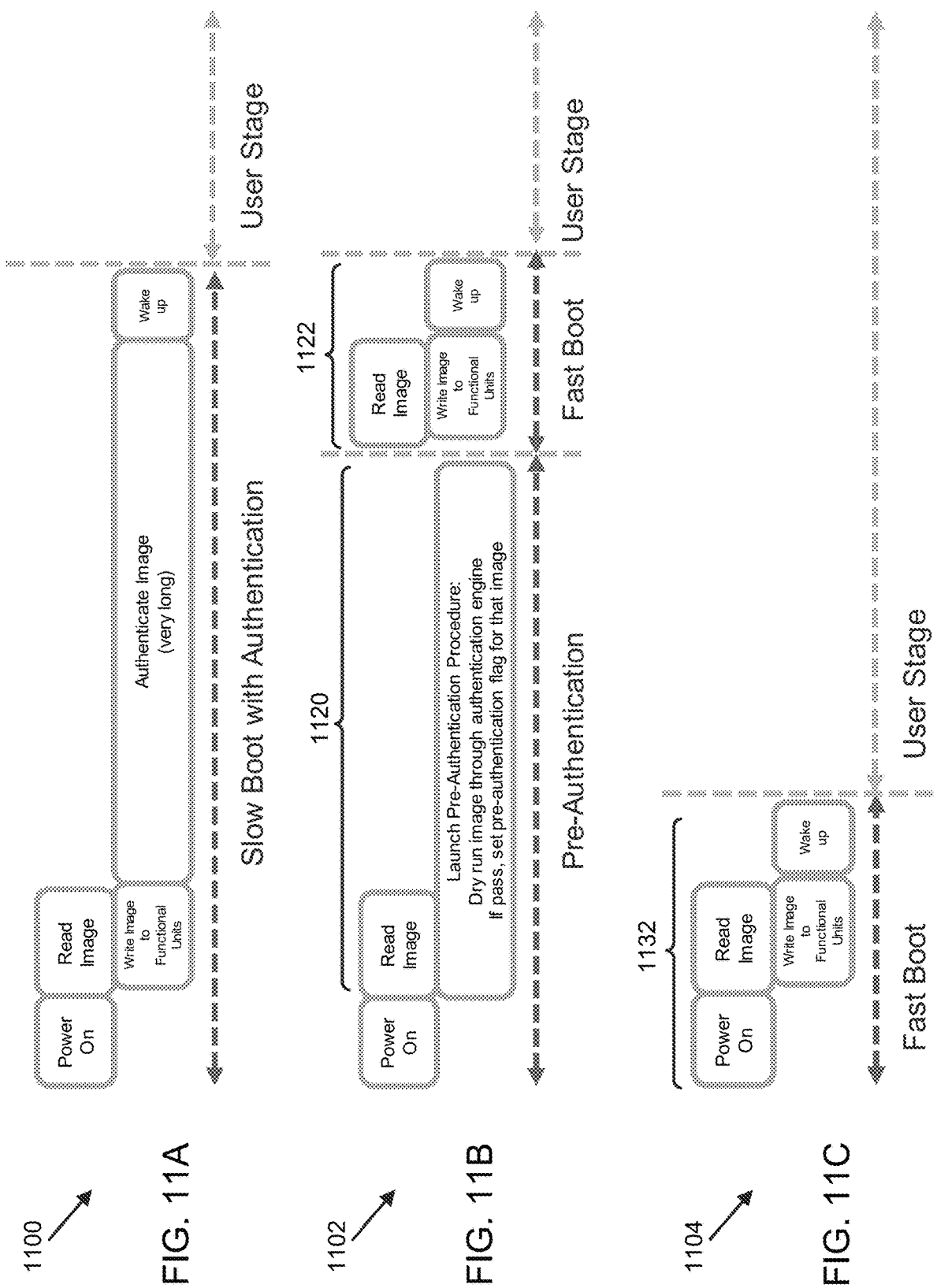

| Boot Method | Other Image Based | Rule Based |
|---|---|---|
| Golden A: 10<br>Update B: 15 | Update=>Golden<br>Update B: 16 ✓<br>Update B: 11 ✗<br>Update B: 9 ✗ | Update=>User defined Min(15)<br>Update B: 16 ✓<br>Update B: 11 ✗<br>Update B: 9 ✗ |
| Ping-Pong<br>A: 10<br>B: 15 | Update=>Other<br>Update A: 16 ✓<br>Update A: 14 ✗<br>Update B: 16 ✓<br>Update B: 11 ✗<br>Update B: 9 ✗ | Update=>User defined Min(15)<br>Update A: 16 ✓<br>Update A: 14 ✗<br>Update B: 16 ✓<br>Update B: 11 ✗<br>Update B: 9 ✗ |
| Internal A: 10<br>External B: 15 | Ext >=Internal<br>Update Ext B: 16 ✓<br>Update Ext B: 11 ✗<br>Update Ext B: 9 ✗ | Update=>User defined Min(15)<br>Update Ext B: 16 ✓<br>Update Ext B: 11 ✗<br>Update Ext B: 9 ✗<br>Update Int A: 10 ✓<br>Update Int A: 14 ✗ |

FIG. 13

SECURE BOOT SYSTEMS AND METHODS FOR PROGRAMMABLE LOGIC DEVICES

CROSS REFERENCE TO RELATED APPLICATIONS

This application is a continuation of International Patent Application No. PCT/US2019/031886 filed May 10, 2019 and entitled "SECURE BOOT SYSTEMS AND METHODS FOR PROGRAMMABLE LOGIC DEVICES," which is incorporated herein by reference in its entirety.

International Patent Application No. PCT/US2019/031886 filed May 10, 2019 claims priority to and the benefit of U.S. Provisional Patent Application No. 62/846,365 filed May 10, 2019 and entitled "SECURE BOOT SYSTEMS AND METHODS FOR PROGRAMMABLE LOGIC DEVICES," which is hereby incorporated by reference in its entirety.

International Patent Application No. PCT/US2019/031886 filed May 10, 2019 claims priority to and the benefit of U.S. Provisional Patent Application No. 62/756,021 filed Nov. 5, 2018 and entitled "ASSET MANAGEMENT SYSTEMS AND METHODS FOR PROGRAMMABLE LOGIC DEVICES," which is hereby incorporated by reference in its entirety.

International Patent Application No. PCT/US2019/031886 filed May 10, 2019 claims priority to and the benefit of U.S. Provisional Patent Application No. 62/756,001 filed Nov. 5, 2018 and entitled "KEY PROVISIONING SYSTEMS AND METHODS FOR PROGRAMMABLE LOGIC DEVICES," which is hereby incorporated by reference in its entirety.

International Patent Application No. PCT/US2019/031886 filed May 10, 2019 claims priority to and the benefit of U.S. Provisional Patent Application No. 62/756,015 filed Nov. 5, 2018 and entitled "FAILURE CHARACTERIZATION SYSTEMS AND METHODS FOR PROGRAMMABLE LOGIC DEVICES," which is hereby incorporated by reference in its entirety.

International Patent Application No. PCT/US2019/031886 filed May 10, 2019 claims priority to and the benefit of U.S. Provisional Patent Application No. 62/670,487 filed May 11, 2018 and entitled "DEVICES WITH PROGRAMMABLE LOGIC AND SECURITY FEATURES AND METHODS OF USING," which is hereby incorporated by reference in its entirety.

TECHNICAL FIELD

The present invention relates generally to programmable logic devices and, more particularly, to secure booting of such devices.

BACKGROUND

Programmable logic devices (PLDs) (e.g., field programmable gate arrays (FPGAs), complex programmable logic devices (CPLDs), field programmable systems on a chip (FPSCs), or other types of programmable devices) may be configured with various user designs to implement desired functionality. Typically, user designs are synthesized and mapped into configurable resources (e.g., programmable logic gates, look-up tables (LUTs), embedded hardware, or other types of resources) and interconnections available in particular PLDs. Physical placement and routing for the synthesized and mapped user designs may then be determined to generate configuration data for the particular PLDs.

Customers for PLDs often dedicate considerable resources to developing configurations for their chosen PLD type and/or capability, and protecting the configuration data and protecting against subversion of a desired operation or capability tied to the chosen PLD and/or developed configuration is of paramount importance to many customers for PLDs. Thus, there is a need in the art for systems and methods to manufacture, protect, distribute, upgrade, and test PLDs and PLD configurations, particularly in the context of trusted computing applications and trusted computing architectures.

BRIEF DESCRIPTION OF THE FIGURES

FIGS. 9A-D illustrate access tables associated with corresponding lock policy plans for a secure PLD in accordance with embodiments of the disclosure.

FIGS. 11A-C illustrate secure boot processes for a secure PLD in accordance with an embodiment of the disclosure.

FIG. 13 illustrates rollback protection rulesets for a secure boot process for a secure PLD in accordance with an embodiment of the disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Figure 1:
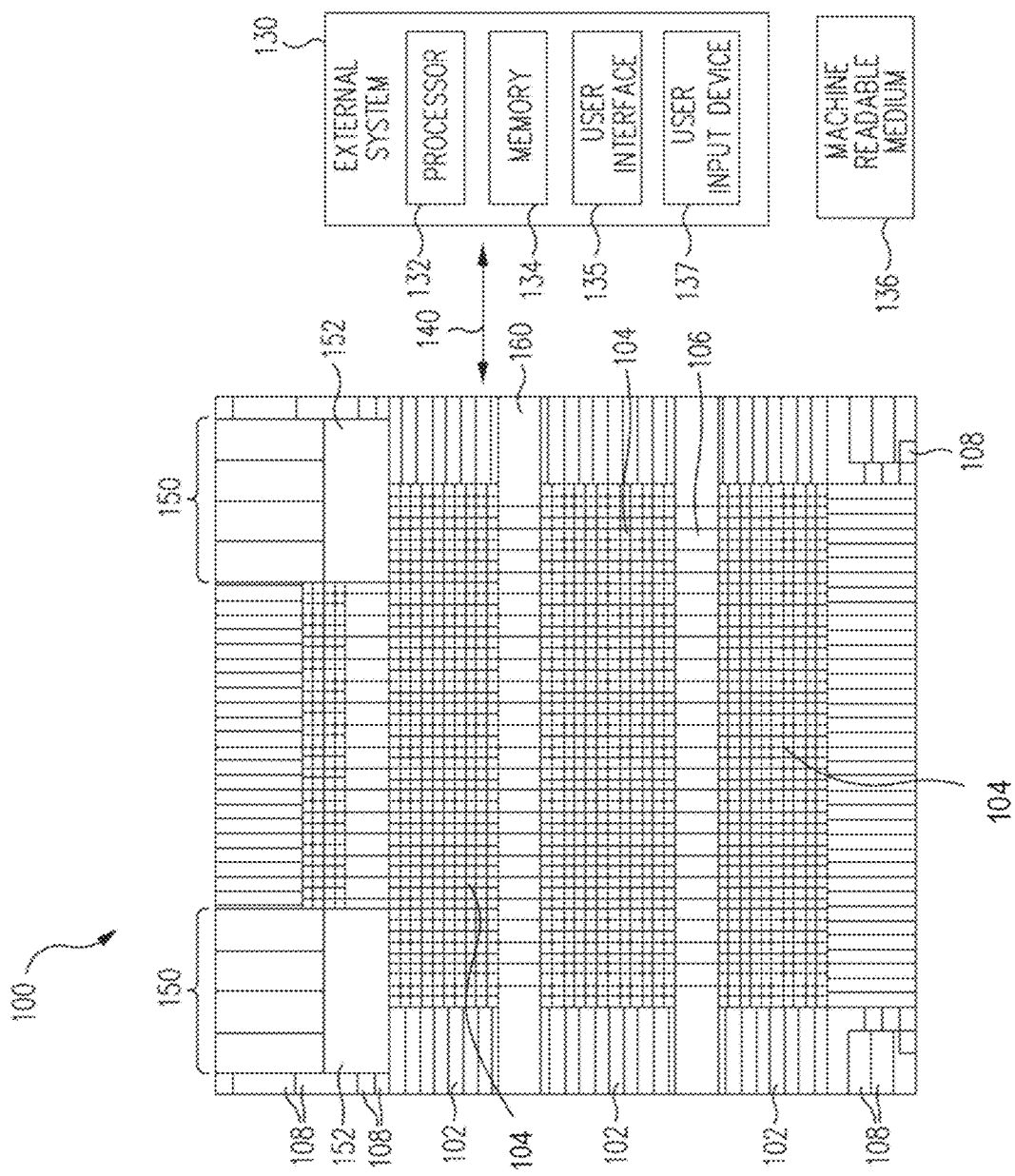
FIG. 1 illustrates a block diagram of a programmable logic device (PLD) in accordance with an embodiment of the disclosure.

The present disclosure provides systems and methods for secure booting of a locked secure programmable logic device (PLD) for use in trusted computing applications and architectures, as described herein. For example, embodiments provide systems and methods for pre-authenticating a configuration image for a PLD fabric of a secure PLD without incurring downtime of the secure PLD by submitting the configuration image to an on-chip authentication engine, authenticating the configuration image, and then storing the configuration image and a pre-authentication status in the secure PLD, all of which can occur while the PLD fabric of the secure PLD is operating according to an already-booted configuration image. Upon authentication, the secure PLD may then reboot, check the pre-authentication status, and selectively program the PLD fabric based on the pre-authentication status and initialize or "wake" the PLD fabric without performing resource intensive further authentication of the configuration image. Accordingly, embodiments are able to secure boot the secure PLD repeatedly with little or no impact on the performance of the secure PLD and/or a trusted platform/user device incorporating the secure PLD, as described herein.

In addition, embodiments provide systems and methods for assigning lock statuses to individual assets and/or groupings of assets, including stored configuration images and/or input/output buses conveying such configuration images, by setting corresponding lock status bits stored in a securable memory of a secure PLD, which may itself be locked to a customer defined configuration and/or operating context, to help reduce or eliminate risk of loss or extraction of the customer's or a manufacturer's data, or reprogramming of such data, without need to secure or limit distribution of locked secure PLDs (e.g., which may otherwise be programmed with non-customer data and potentially be used to subvert various security operations for a trusted platform, for example, including securely configuring and/or booting such platform/user device, as described herein).

In accordance with embodiments set forth herein, techniques are provided to securely implement user designs in programmable logic devices (PLDs). In various embodiments, a user design may be converted into and/or represented by a set of PLD components (e.g., configured for logic, arithmetic, or other hardware functions) and their associated interconnections available in a PLD. For example, a PLD may include a number of programmable logic blocks (PLBs), each PLB including a number of logic cells, and configurable routing resources that may be used to interconnect the PLBs and/or logic cells. In some embodiments, each PLB may be implemented with between 2 and 16 or between 2 and 32 logic cells.

In general, a PLD (e.g., an FPGA) fabric includes one or more routing structures and an array of similarly arranged logic cells arranged within programmable function blocks (e.g., PFBs and/or PLBs). The purpose of the routing structures is to programmably connect the ports of the logic cells/PLBs to one another in such combinations as necessary to achieve an intended functionality. A secure PLD may include various additional "hard" engines or modules configured to provide a range of security functionality that may be linked to operation of the PLD fabric to provide configurable trusted computing functionality and/or architectures. Routing flexibility and configurable function embedding may be used when synthesizing, mapping, placing, and/or routing a user design into a number of PLD components. As a result of various user design optimization processes, which can incur significant design time and cost, a user design can be implemented relatively efficiently, thereby freeing up configurable PLD components that would otherwise be occupied by additional operations and routing resources. In some embodiments, an optimized user design may be represented by a netlist that identifies various types of components provided by the PLD and their associated signals. In embodiments that produce a netlist of the converted user design, the optimization process may be performed on such a netlist. Once optimized, such configuration may be encrypted and signed and/or otherwise secured for distribution to a secured PLD, and such process may include one or more key provisioning processes, as described herein.

Referring now to the drawings, FIG. 1 illustrates a block diagram of a PLD 100 in accordance with an embodiment of the disclosure. PLD 100 (e.g., a field programmable gate array (FPGA)), a complex programmable logic device (CPLD), a field programmable system on a chip (FPSC), or other type of programmable device) generally includes input/output (I/O) blocks 102 and logic blocks 104 (e.g., also referred to as programmable logic blocks (PLBs), programmable functional units (PFUs), or programmable logic cells (PLCs)). More generally, the individual elements of PLD 100 may be referred to as a PLD fabric.

I/O blocks 102 provide I/O functionality (e.g., to support one or more I/O and/or memory interface standards) for PLD 100, while programmable logic blocks 104 provide logic functionality (e.g., LUT-based logic or logic gate array-based logic) for PLD 100. Additional I/O functionality may be provided by serializer/deserializer (SERDES) blocks 150 and physical coding sublayer (PCS) blocks 152. PLD 100 may also include hard intellectual property core (IP) blocks 160 to provide additional functionality (e.g., substantially predetermined functionality provided in hardware which may be configured with less programming than logic blocks 104).

PLD 100 may also include blocks of memory 106 (e.g., blocks of EEPROM, block SRAM, flash memory, MRAM, and/or RRAM), clock-related circuitry 108 (e.g., clock sources, PLL circuits, and/or DLL circuits), and/or various routing resources 180 (e.g., interconnect and appropriate switching logic to provide paths for routing signals throughout PLD 100, such as for clock signals, data signals, or others) as appropriate. In general, the various elements of PLD 100 may be used to perform their intended functions for desired applications, as would be understood by one skilled in the art.

For example, certain I/O blocks 102 may be used for programming memory 106 or transferring information (e.g., various types of user data and/or control signals) to/from PLD 100. Other I/O blocks 102 include a first programming port (which may represent a central processing unit (CPU) port, a peripheral data port, an SPI interface, and/or a sysCONFIG programming port) and/or a second programming port such as a joint test action group (JTAG) port (e.g., by employing standards such as Institute of Electrical and Electronics Engineers (IEEE) 1149.1 or 1532 standards). In various embodiments, I/O blocks 102 may be included to receive configuration data and commands (e.g., over one or more connections 140) to configure PLD 100 for its intended use and to support serial or parallel device configuration and information transfer with SERDES blocks 150, PCS blocks 152, hard IP blocks 160, and/or logic blocks 104 as appropriate.

It should be understood that the number and placement of the various elements are not limiting and may depend upon the desired application. For example, various elements may not be required for a desired application or design specification (e.g., for the type of programmable device selected).

Furthermore, it should be understood that the elements are illustrated in block form for clarity and that various elements would typically be distributed throughout PLD 100, such as in and between logic blocks 104, hard IP blocks 160, and routing resources (e.g., routing resources 180 of FIG. 2) to perform their conventional functions (e.g., storing configuration data that configures PLD 100 or providing interconnect structure within PLD 100). It should also be understood that the various embodiments disclosed herein are not limited to programmable logic devices, such as PLD 100, and may be applied to various other types of programmable devices, as would be understood by one skilled in the art.

An external system 130 may be used to create a desired user configuration or design of PLD 100 and generate corresponding configuration data to program (e.g., configure) PLD 100. For example, system 130 may provide such configuration data to one or more I/O blocks 102, SERDES blocks 150, and/or other portions of PLD 100. As a result, programmable logic blocks 104, various routing resources, and any other appropriate components of PLD 100 may be configured to operate in accordance with user-specified applications.

In the illustrated embodiment, system 130 is implemented as a computer system. In this regard, system 130 includes, for example, one or more processors 132 which may be configured to execute instructions, such as software instructions, provided in one or more memories 134 and/or stored in non-transitory form in one or more non-transitory machine readable mediums 136 (e.g., which may be internal or external to system 130). For example, in some embodiments, system 130 may run PLD configuration software, such as Lattice Diamond System Planner software available from Lattice Semiconductor Corporation to permit a user to create a desired configuration and generate corresponding configuration data to program PLD 100.

System 130 also includes, for example, a user interface 135 (e.g., a screen or display) to display information to a user, and one or more user input devices 137 (e.g., a keyboard, mouse, trackball, touchscreen, and/or other device) to receive user commands or design entry to prepare a desired configuration of PLD 100.

Figure 2:
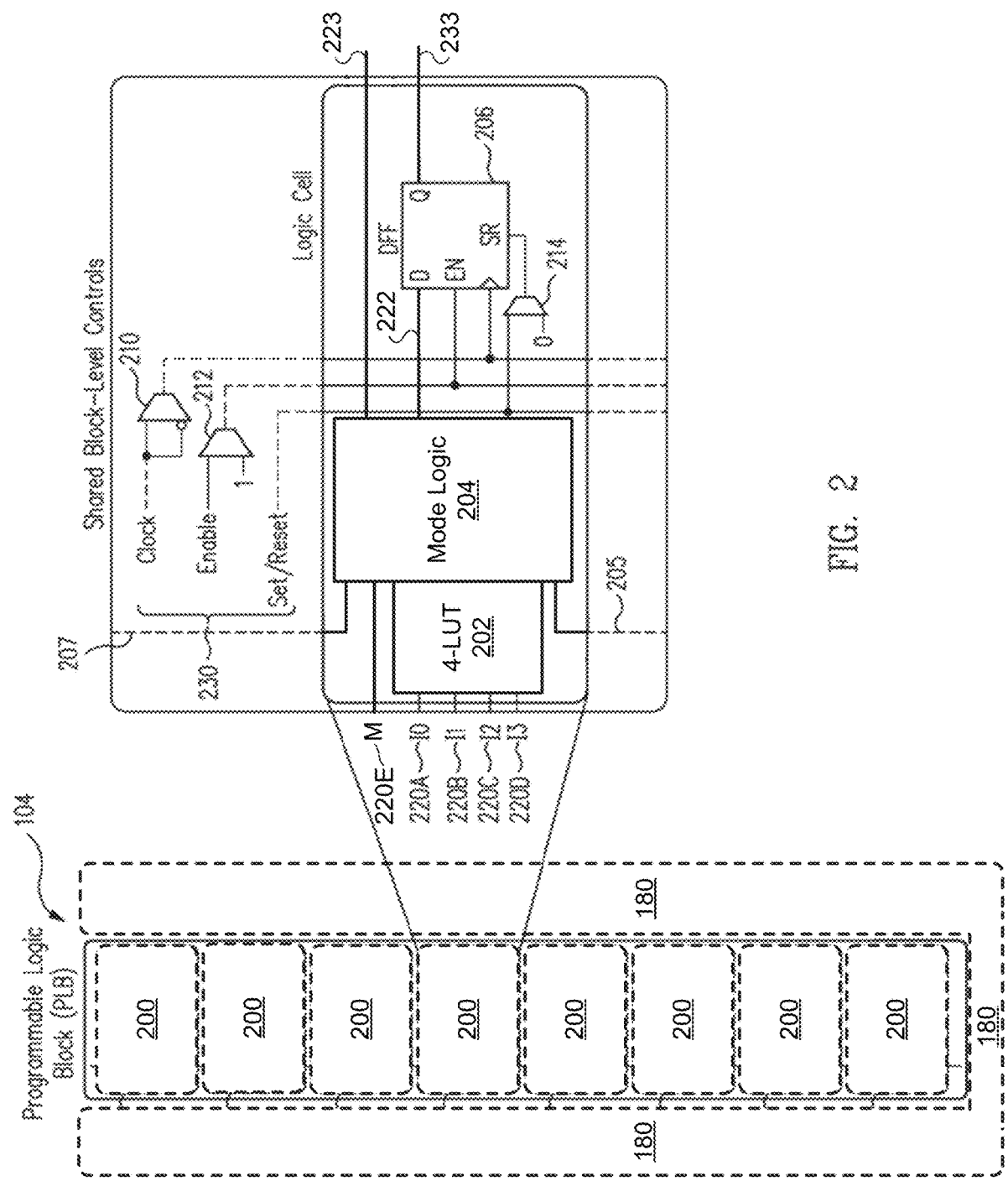
FIG. 2 illustrates a block diagram of a logic block for a PLD in accordance with an embodiment of the disclosure.

FIG. 2 illustrates a block diagram of a logic block 104 of PLD 100 in accordance with an embodiment of the disclosure. As discussed, PLD 100 includes a plurality of logic blocks 104 including various components to provide logic and arithmetic functionality. In the example embodiment shown in FIG. 2, logic block 104 includes a plurality of logic cells 200, which may be interconnected internally within logic block 104 and/or externally using routing resources 180. For example, each logic cell 200 may include various components such as: a lookup table (LUT) 202, a mode logic circuit 204, a register 206 (e.g., a flip-flop or latch), and various programmable multiplexers (e.g., programmable multiplexers 212 and 214) for selecting desired signal paths for logic cell 200 and/or between logic cells 200. In this example, LUT 202 accepts four inputs 220A-220D, which makes it a four-input LUT (which may be abbreviated as "4-LUT" or "LUT4") that can be programmed by configuration data for PLD 100 to implement any appropriate logic operation having four inputs or less. Mode Logic 204 may include various logic elements and/or additional inputs, such as input 220E, to support the functionality of various modes, as described herein. LUT 202 in other examples may be of any other suitable size having any other suitable number of inputs for a particular implementation of a PLD. In some embodiments, different size LUTs may be provided for different logic blocks 104 and/or different logic cells 200.

An output signal 222 from LUT 202 and/or mode logic 204 may in some embodiments be passed through register 206 to provide an output signal 233 of logic cell 200. In various embodiments, an output signal 223 from LUT 202 and/or mode logic 204 may be passed to output 223 directly, as shown. Depending on the configuration of multiplexers 210-214 and/or mode logic 204, output signal 222 may be temporarily stored (e.g., latched) in latch 206 according to control signals 230. In some embodiments, configuration data for PLD 100 may configure output 223 and/or 233 of logic cell 200 to be provided as one or more inputs of another logic cell 200 (e.g., in another logic block or the same logic block) in a staged or cascaded arrangement (e.g., comprising multiple levels) to configure logic operations that cannot be implemented in a single logic cell 200 (e.g., logic operations that have too many inputs to be implemented by a single LUT 202). Moreover, logic cells 200 may be implemented with multiple outputs and/or interconnections to facilitate selectable modes of operation, as described herein.

Mode logic circuit 204 may be utilized for some configurations of PLD 100 to efficiently implement arithmetic operations such as adders, subtractors, comparators, counters, or other operations, to efficiently form some extended logic operations (e.g., higher order LUTs, working on multiple bit data), to efficiently implement a relatively small RAM, and/or to allow for selection between logic, arithmetic, extended logic, and/or other selectable modes of operation. In this regard, mode logic circuits 204, across multiple logic cells 202, may be chained together to pass carry-in signals 205 and carry-out signals 207, and/or other signals (e.g., output signals 222) between adjacent logic cells 202, as described herein. In the example of FIG. 2, carry-in signal 205 may be passed directly to mode logic circuit 204, for example, or may be passed to mode logic circuit 204 by configuring one or more programmable multiplexers, as described herein. In some embodiments, mode logic circuits 204 may be chained across multiple logic blocks 104.

Logic cell 200 illustrated in FIG. 2 is merely an example, and logic cells 200 according to different embodiments may include different combinations and arrangements of PLD components. Also, although FIG. 2 illustrates logic block 104 having eight logic cells 200, logic block 104 according to other embodiments may include fewer logic cells 200 or more logic cells 200. Each of the logic cells 200 of logic block 104 may be used to implement a portion of a user design implemented by PLD 100. In this regard, PLD 100 may include many logic blocks 104, each of which may include logic cells 200 and/or other components which are used to collectively implement the user design.

As further described herein, portions of a user design may be adjusted to occupy fewer logic cells 200, fewer logic blocks 104, and/or with less burden on routing resources 180 when PLD 100 is configured to implement the user design. Such adjustments according to various embodiments may identify certain logic, arithmetic, and/or extended logic operations, to be implemented in an arrangement occupying multiple embodiments of logic cells 200 and/or logic blocks 104. As further described herein, an optimization process may route various signal connections associated with the arithmetic/logic operations described herein, such that a logic, ripple arithmetic, or extended logic operation may be implemented into one or more logic cells 200 and/or logic blocks 104 to be associated with the preceding arithmetic/logic operations.

Figure 3:
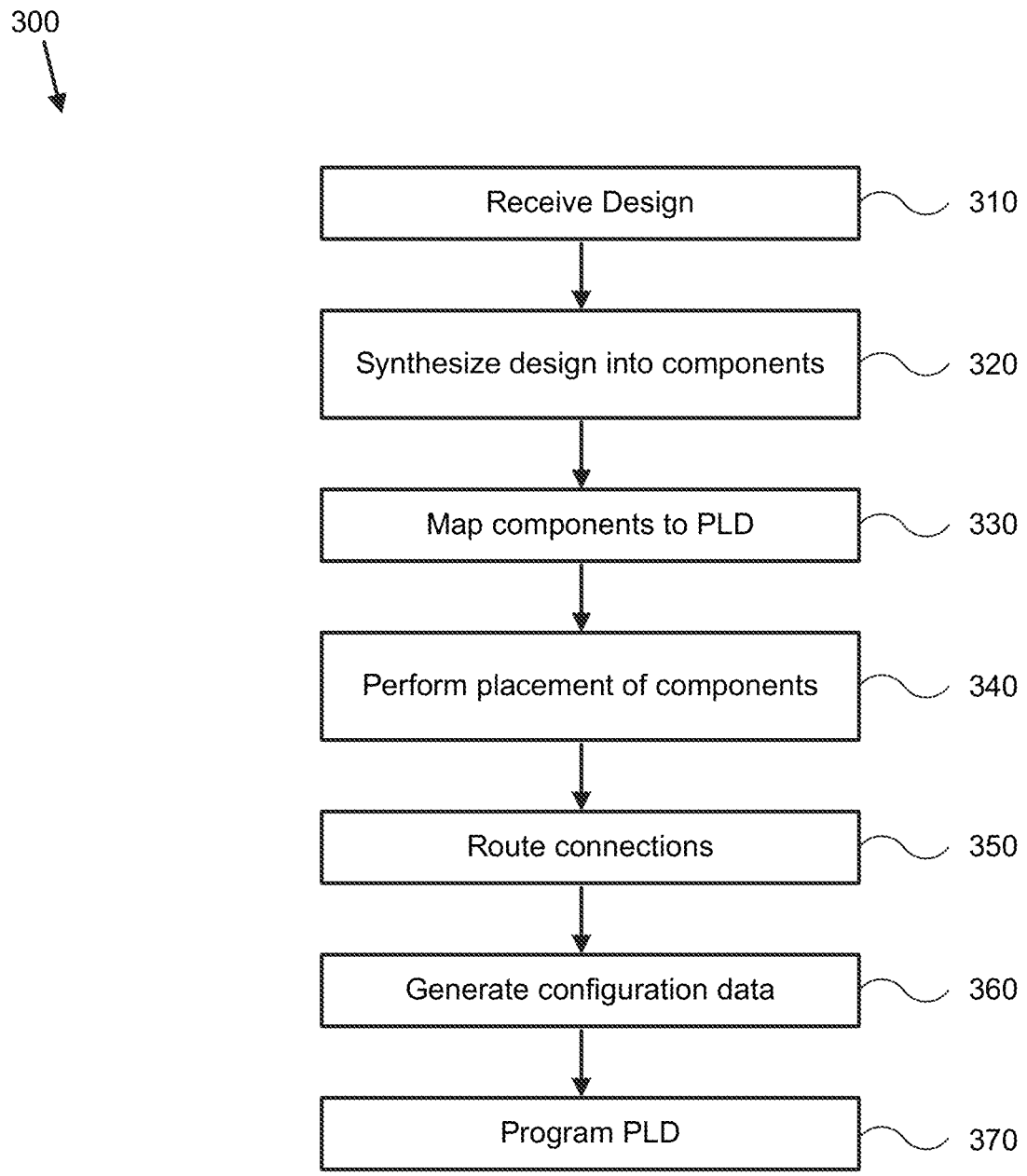
FIG. 3 illustrates a design process for a PLD in accordance with an embodiment of the disclosure.

FIG. 3 illustrates a design process 300 for a PLD in accordance with an embodiment of the disclosure. For example, the process of FIG. 3 may be performed by system 130 running Lattice Diamond software to configure PLD 100. In some embodiments, the various files and information referenced in FIG. 3 may be stored, for example, in one or more databases and/or other data structures in memory 134, machine readable medium 136, and/or otherwise. In various embodiments, such files and/or information may be encrypted or otherwise secured when stored and/or conveyed to PLD 100 and/or other devices or systems.

In operation 310, system 130 receives a user design that specifies the desired functionality of PLD 100. For example, the user may interact with system 130 (e.g., through user input device 137 and hardware description language (HDL) code representing the design) to identify various features of the user design (e.g., high level logic operations, hardware configurations, and/or other features). In some embodiments, the user design may be provided in a register transfer level (RTL) description (e.g., a gate level description). System 130 may perform one or more rule checks to confirm that the user design describes a valid configuration of PLD 100. For example, system 130 may reject invalid configurations and/or request the user to provide new design information as appropriate.

In operation 320, system 130 synthesizes the design to create a netlist (e.g., a synthesized RTL description) identifying an abstract logic implementation of the user design as a plurality of logic components (e.g., also referred to as netlist components), which may include both programmable components and hard IP components of PLD 100. In some embodiments, the netlist may be stored in Electronic Design Interchange Format (EDIF) in a Native Generic Database (NGD) file.

In some embodiments, synthesizing the design into a netlist in operation 320 may involve converting (e.g., translating) the high-level description of logic operations, hardware configurations, and/or other features in the user design into a set of PLD components (e.g., logic blocks 104, logic cells 200, and other components of PLD 100 configured for logic, arithmetic, or other hardware functions to implement the user design) and their associated interconnections or signals. Depending on embodiments, the converted user design may be represented as a netlist.

In some embodiments, synthesizing the design into a netlist in operation 320 may further involve performing an optimization process on the user design (e.g., the user design converted/translated into a set of PLD components and their associated interconnections or signals) to reduce propagation delays, consumption of PLD resources and routing resources, and/or otherwise optimize the performance of the PLD when configured to implement the user design. Depending on embodiments, the optimization process may be performed on a netlist representing the converted/translated user design. Depending on embodiments, the optimization process may represent the optimized user design in a netlist (e.g., to produce an optimized netlist).

In some embodiments, the optimization process may include optimizing certain instances of a logic function operation, a ripple arithmetic operation, and/or an extended logic function operation which, when a PLD is configured to implement the user design, would occupy a plurality of configurable PLD components (e.g., logic cells 200, logic blocks 104, and/or routing resources 180). For example, the optimization process may include detecting multiple mode or configurable logic cells implementing logic function operations, ripple arithmetic operations, extended logic function operations, and/or corresponding routing resources in the user design, interchanging operational modes of logic cells implementing the various operations to reduce the number of PLD components and/or routing resources used to implement the operations and/or to reduce the propagation delay associated with the operations, and/or reprogramming corresponding LUTs and/or mode logic to account for the interchanged operational modes.

In another example, the optimization process may include detecting extended logic function operations and/or corresponding routing resources in the user design, implementing the extended logic operations into multiple mode or convertible logic cells with single physical logic cell outputs, routing or coupling the logic cell outputs of a first set of logic cells to the inputs of a second set of logic cells to reduce the number of PLD components used to implement the extended logic operations and/or routing resources and/or to reduce the propagation delay associated with the extended logic operations, and/or programming corresponding LUTs and/or mode logic to implement the extended logic function operations with at least the first and second sets of logic cells.

In another example, the optimization process may include detecting multiple mode or configurable logic cells implementing logic function operations, ripple arithmetic operations, extended logic function operations, and/or corresponding routing resources in the user design, interchanging operational modes of logic cells implementing the various operations to provide a programmable register along a signal path within the PLD to reduce propagation delay associated with the signal path, and reprogramming corresponding LUTs, mode logic, and/or other logic cell control bits/registers to account for the interchanged operational modes and/or to program the programmable register to store or latch a signal on the signal path.

In operation 330, system 130 performs a mapping process that identifies components of PLD 100 that may be used to implement the user design. In this regard, system 130 may map the optimized netlist (e.g., stored in operation 320 as a result of the optimization process) to various types of components provided by PLD 100 (e.g., logic blocks 104, logic cells 200, embedded hardware, and/or other portions of PLD 100) and their associated signals (e.g., in a logical fashion, but without yet specifying placement or routing). In some embodiments, the mapping may be performed on one or more previously-stored NGD files, with the mapping results stored as a physical design file (e.g., also referred to as an NCD file). In some embodiments, the mapping process may be performed as part of the synthesis process in operation 320 to produce a netlist that is mapped to PLD components.

In operation 340, system 130 performs a placement process to assign the mapped netlist components to particular physical components residing at specific physical locations of the PLD 100 (e.g., assigned to particular logic cells 200, logic blocks 104, routing resources 180, and/or other physical components of PLD 100), and thus determine a layout for the PLD 100. In some embodiments, the placement may be performed on one or more previously-stored NCD files, with the placement results stored as another physical design file.

In operation 350, system 130 performs a routing process to route connections (e.g., using routing resources 180) among the components of PLD 100 based on the placement layout determined in operation 340 to realize the physical interconnections among the placed components. In some embodiments, the routing may be performed on one or more previously-stored NCD files, with the routing results stored as another physical design file.

In various embodiments, routing the connections in operation 350 may further involve performing an optimization process on the user design to reduce propagation delays, consumption of PLD resources and/or routing resources, and/or otherwise optimize the performance of the PLD when configured to implement the user design. The optimization process may in some embodiments be performed on a physical design file representing the converted/translated user design, and the optimization process may represent the optimized user design in the physical design file (e.g., to produce an optimized physical design file).

In some embodiments, the optimization process may include optimizing certain instances of a logic function operation, a ripple arithmetic operation, and/or an extended logic function operation which, when a PLD is configured to implement the user design, would occupy a plurality of configurable PLD components (e.g., logic cells 200, logic blocks 104, and/or routing resources 180). For example, the optimization process may include detecting multiple mode or configurable logic cells implementing logic function operations, ripple arithmetic operations, extended logic function operations, and/or corresponding routing resources in the user design, interchanging operational modes of logic cells implementing the various operations to reduce the number of PLD components and/or routing resources used to implement the operations and/or to reduce the propagation delay associated with the operations, and/or reprogramming corresponding LUTs and/or mode logic to account for the interchanged operational modes.

In another example, the optimization process may include detecting extended logic function operations and/or corresponding routing resources in the user design, implementing the extended logic operations into multiple mode or convertible logic cells with single physical logic cell outputs, routing or coupling the logic cell outputs of a first set of logic cells to the inputs of a second set of logic cells to reduce the number of PLD components used to implement the extended logic operations and/or routing resources and/or to reduce the propagation delay associated with the extended logic operations, and/or programming corresponding LUTs and/or mode logic to implement the extended logic function operations with at least the first and second sets of logic cells.

In another example, the optimization process may include detecting multiple mode or configurable logic cells implementing logic function operations, ripple arithmetic operations, extended logic function operations, and/or corresponding routing resources in the user design, interchanging operational modes of logic cells implementing the various operations to provide a programmable register along a signal path within the PLD to reduce propagation delay associated with the signal path, and reprogramming corresponding LUTs, mode logic, and/or other logic cell control bits/registers to account for the interchanged operational modes and/or to program the programmable register to store or latch a signal on the signal path.

Changes in the routing may be propagated back to prior operations, such as synthesis, mapping, and/or placement, to further optimize various aspects of the user design.

Thus, following operation 350, one or more physical design files may be provided which specify the user design after it has been synthesized (e.g., converted and optimized), mapped, placed, and routed (e.g., further optimized) for PLD 100 (e.g., by combining the results of the corresponding previous operations). In operation 360, system 130 generates configuration data for the synthesized, mapped, placed, and routed user design. In various embodiments, such configuration data may be encrypted and/or otherwise secured as part of such generation process, as described more fully herein. In operation 370, system 130 configures PLD 100 with the configuration data by, for example, loading a configuration data bitstream (e.g., a "configuration") into PLD 100 over connection 140. Such configuration may be provided in an encrypted, signed, or unsecured/unauthenticated form, for example, and PLD 100 may be configured to treat secured and unsecured configurations differently, as described herein.

Figure 4:
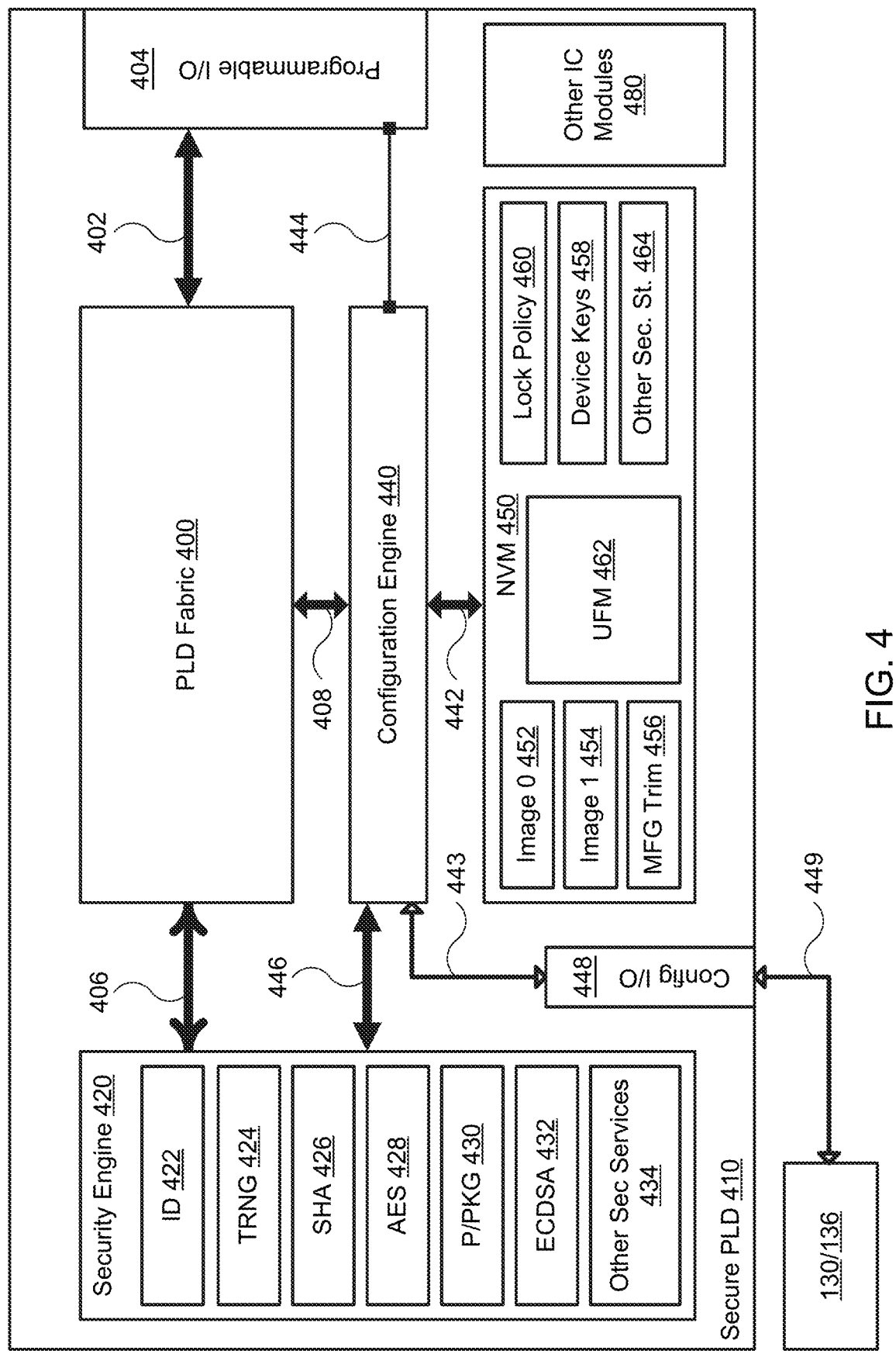
FIG. 4 illustrates a block diagram of a secure PLD in accordance with an embodiment of the disclosure.

FIG. 4 illustrates a block diagram of a secure PLD 410 in accordance with an embodiment of the disclosure. In various embodiments, secure PLD 410 may be implemented by elements similar to those described with respect to PLD 100 in FIG. 1, but with additional configurable and/or hard IP elements configured to facilitate operation of secure PLD 410 in a trusted computing application and/or architecture, as described herein. In particular, secure PLD 410 may include a PLD fabric 400 linked by various buses to a security engine 420, a configuration engine 440, a non-volatile memory (NVM) 450, a programmable I/O 404, and/or other integrated circuit (IC) modules 480, all implemented on a monolithic IC, as shown. In general, PLD fabric 400 may be implemented by any of the various elements described with respect to PLD 100 and may be configured using a design process similar to process 300 described in relation to FIG. 3 to generate and program PLD fabric 400 according to a desired configuration. More specifically, secure PLD 400 may be configured to use various identified hard IP elements identified in FIG. 4 to receive, decrypt, authenticate, and/or verify a received configuration prior to programming PLD fabric 400 according to the received configuration.

Security engine 420 may be implemented as a hard IP resource configured to provide various security functions for use by PLD fabric 400 and/or configuration engine 440. In the embodiment shown in FIG. 4, security engine 420 includes a device ID 422 (e.g., a 64-bit unique and device specific ID), a true random number generator 424, a secure hash algorithm (SHA) service 426 (e.g., an SHA256, SHA-2, and/or SHA-3 service), an advanced encryption standard (AES) service 428 (e.g., an AES128/256 encrypt/decrypt service), a public/private key pair generator (P/PKG) 430, an elliptic curve digital signature algorithm (ECDSA) authentication service 432 (e.g., an ECDSA256 service), and/or other security services 434. As also shown in FIG. 4, security engine 420 may be communicatively linked to PLD fabric 400 over limited bus 406 and to configuration engine 440 over secure bus 446. In general, limited bus 406 may be configured to allow PLD fabric 400 to access a limited set of security functions hosted by security engine 420 and/or to access such security functions in a limited manner, such as disallowing configuration of any one or all the security functions hosted by security engine 420, disallowing access to device ID 422, and/or disallowing access to a private key of a public/private key pair generated by P/PKG 430. By contrast, secure bus 446 may be configured to allow configuration engine 440 to access and/or modify all security functions, data, and/or configurations of security engine 420. In general, either or both limited bus 406 and secure bus 446 may be configured to provide encrypted and/or otherwise secured communication between security engine 420 and other elements of secure PLD 410.

Configuration engine 440 may be implemented as a hard IP resource configured to manage the configurations of and/or communications amongst the various elements of secure PLD 410. For example, configuration engine 440 may be configured to receive an encrypted/secured configuration of PLD fabric 400 from external system 130/machine readable medium 136 over configuration I/O 448, use security functions of security engine 420 to authenticate and/or decrypt such configuration, store the authenticated and/or decrypted configuration in NVM 450, soft or hard lock the portions of NVM 450 corresponding to the stored configuration, tag the stored configuration as authenticated and/or verified bootable, and/or program PLD fabric 400 according to the authenticated, decrypted, verified, and/or locked configuration, as described herein. In further embodiments, configuration engine 440 may be configured to configure at least a portion of programmable I/O 404 (e.g., to enable and/or disable at least portions of programmable I/O 404) over configuration port 444, as shown.

More generally, configuration engine 440 may be configured to manage or control configurations of elements of secure PLD 410, lock statuses of elements of secure PLD 410, boot of PLD fabric 400, and flow control throughout secure PLD 410. For example, configuration engine 440 may be configured to soft lock or unlock or hard lock any one or portion of buses 408, 442, 443, 446, for example, and/or to soft lock or unlock or hard lock any portion or sector of NVM 450. In a default unlocked configuration, buses 408, 442, and 446 may be implemented as secure buses similar in function to secure bus 446. External access bus 443 to configuration I/O 448 may be implemented according to one or more of a JTAG, I2C, SPI, and/or other external access bus or protocol, for example, configured to provide lockable/unlockable access to and/or from external system 130/machine readable medium 136. In a particular embodiment, secure bus 408 may be implemented according to a wishbone bus/interface.

NVM 450 may be implemented as a hard IP resource configured to provide securable non-volatile storage of data used to facilitate secure operation of secure PLD 410. For example, NVM 450 may include lock policy sector 460 corresponding to memory locations in NVM 460 indicating a lock status of data stored in NVM 450. The contents of lock policy sector 460 may be transferred to shadow registers within configuration engine 440 upon power on of secure PLD 410, for example, to allow such contents to be modified dynamically by configuration engine 440 and/or PLD fabric 400, depending on settings/lock statuses in lock policy sector 460. In general, the lock status of a particular resource indicates read, write/program, and/or erase access for that resource, as against PLD fabric 400, configuration I/O 448/external access bus 443, and/or other elements of secure PLD 410.

As described herein, "soft" lock refers to a read, write, and/or erase access status of a bus/port or memory location in NVM 450 that can be programmatically enabled or disabled by PLD fabric 400 and/or across external access bus 443 to granularly allow or disallow read, write, and/or erase access to the corresponding resource. "Hard" lock refers to a read, write, and/or erase access status of a bus/port or memory location in NVM 450 that can be programmatically enabled across external access bus 443, but that cannot be enabled or disabled by PLD fabric 400 and that cannot be disabled across external access bus 443. In various embodiments, assertion of a hard lock is generally one-way and eliminates the ability of PLD fabric 400 and/or external access bus 443 to further modify the lock status of all secured resources within secure PLD 410. In some embodiments, such locking scheme may be implemented by four bits for each resource (e.g., bus/port or sector of memory within NVM 450), one bit each for hard lock enable, read lock enable, write lock enable, and erase lock enable.

As shown in the embodiment illustrated by FIG. 4, NVM 450 may include multiple differentiated lockable sectors, each of which may have its own lock status. Such lockable sectors may include, for example, one or more of a first configuration image sector 452, a second configuration image sector 454, a manufacturer-specified trim sector 456, a device key sector 458 (e.g., an AES key sector and a separate public key/key pair sector), a lock policy sector 460, a user flash memory (UFM) sector 462, and/or other defined securable storage sectors 464, as shown. In some embodiments, UFM sector 462 may be further differentiated into subsectors each of which may have its own lock status. Lock policy sector 460 may store the lock status of each sector of NVM 450, for example, including its own lock status. First and second configuration image sectors 452-454 may each store a configuration for PLD fabric 400, for example, and may further be tagged by version and/or date and as pre-authenticated so as to allow them to be selected (e.g., based on version or date) and used to program PLD fabric without performing an authentication process. Trim sector 456 may be used to store manufacturer trim and/or other data specific to a particular secure PLD 410, for example, such as a modifiable customer-specific ordering part number derived from device ID 422 and a generated customer ID number, as described herein. Device key sectors 458 may be used to store encryption/decryption keys, public/private keys, and/or other security keys specific to a particular secure PLD 410. Lock policy sector 460 may be configured to store lock statuses for resources of NVM 450, configuration engine 440, configuration I/O 448, and/or other elements of secure PLD 410. UFM sector 462 may be used to store user data generally accessible by PLD fabric 400, such as configurations or application-specific security keys, certificates, and/or other secure(d) user data. Other securable storage sectors 464 may be used to store other device specific secure(d) data. Any one or more individual elements, portions, or sectors of NVM 450 may be implemented as configurable memory, for example, or one-time programmable (OTP) memory, as described herein.

Programmable I/O 404 may be implemented as at least partially configurable resources configured to provide or support a communication link between PLD fabric 400 and an external controller, memory, and/or other device, for example, across bus 402 (e.g., a bus configured to link portions of PLD fabric 400 to programmable I/O 404. In some embodiments, bus 402 and/or programmable I/O 404 may be integrated with PLD fabric 400. Configuration I/O 448 may be implemented as hard IP resources configured to support one or more external bus interfaces and/or protocols 449 to support communications with external system 130/machine readable medium 136, as described herein. In some embodiments, configuration I/O 448 and/or bus 443 may be integrated with configuration engine 440. More generally, one or more elements of secure PLD 410 shown as separate in FIG. 4 may be integrated with and/or within each other. Other IC modules 480 may be implemented as hard and/or configurable IP resources configured to facilitate operation of secure PLD 410.

Figure 5A:
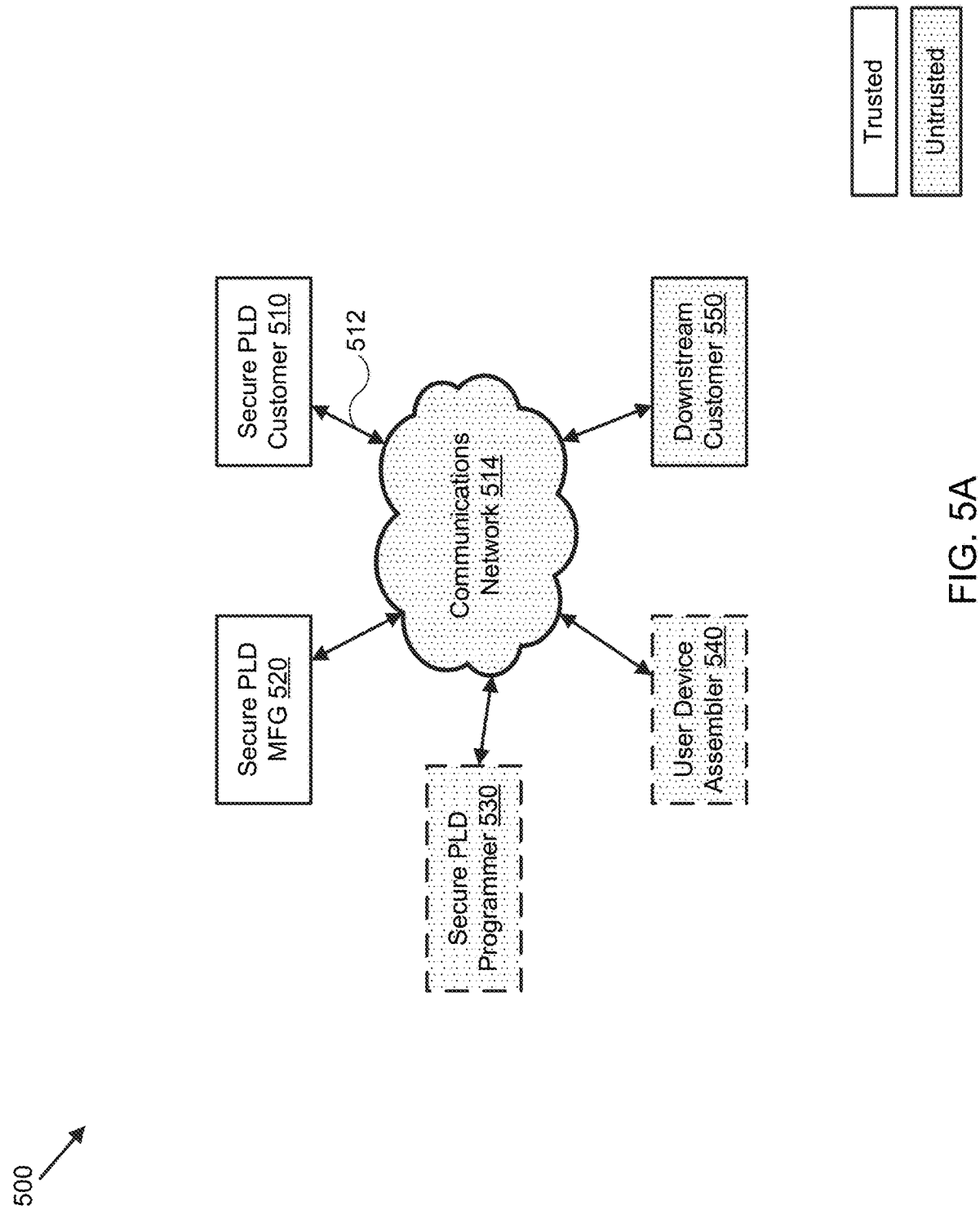
FIG. 5A illustrates a block diagram of a secure PLD provisioning system in accordance with an embodiment of the disclosure.

FIG. 5A illustrates a block diagram of a secure PLD provisioning system 500 in accordance with an embodiment of the disclosure. For example, one or more elements of provisioning system 500 may be configured to perform at least portions of the provisioning process described in relation to FIG. 7. In the embodiment shown in FIG. 5A, secure PLD provisioning system 500 includes secure PLD customer 510 and secure PLD manufacturer 520 configured to communicate with each other over communication links 512 and communications network 514. In general, communication links 512 may be implemented by one or more wired and/or wireless communication links configured to support data communications to and from communications network 514, and communications network 514 may be implemented by one or more local and/or wide area networks configured to support data communications generally (e.g., internet service providers, cellular networks, and/or the Internet). Each of the remaining elements of secure PLD provisioning system 500 represent entities in the manufacturing and delivery chain for secure PLD 410, for example, and may generally be implemented by network communication devices each similar in scope to external system 130 of FIG. 1 and configured to communicate across communication links 512 and communications network 514. In various embodiments, secure PLD provisioning system 500 may be configured to provision keys and/or other secure communication elements and/or mechanisms for secure PLDs similar to secure PLD 410.

As shown in FIG. 5A, secure PLD customer 510 and secure PLD manufacturer 520 may be considered trusted entities within provisioning system 500, and all other elements of provisioning system 500 may be considered untrusted entities, such that customer and/or manufacturer software and/or hardware should generally be protected or otherwise secured against unwanted access or manipulation by downstream customer 550 and/or optional secure PLD programmer 530 and user device assembler 540. For example, in general operation, secure PLD customer 510 requests one or more secure PLDs 410 from secure PLD manufacturer 520 and generates a proprietary configuration to be programmed into PLD fabric 400 of secure PLD 410. Secure PLD manufacturer 520 prepares the one or more requested secure PLDs 410 by fabricating the individual ICs and programming them with security mechanisms (e.g., locking them) to bar further programming by configurations not supplied by secure PLD customer 510 and/or secure PLD manufacturer 520. Secure PLD customer 510 may provide device specific encrypted configurations to optional secure PLD programmer 530, and secure PLD manufacturer 520 may provide the locked secure PLDs 410 to secure PLD programmer 530, such that secure PLD programmer 530 can only program each locked secure PLD 410 with its device-specific encrypted configuration, and such that secure PLD programmer 530 cannot easily determine the unencrypted contents of the device-specific encrypted configuration.

Secure PLD programmer 530 may deliver the programmed and locked secure PLDs 410 to optional user device assembler 540 (e.g., a motherboard assembler, a smart phone assembler, and/or other user device/embedded device assembler/manufacturer), which integrates the programmed and locked secure PLDs 410 with the user device and provides the integrated user device to downstream customer 550, all without secure PLD programmer 530 and downstream customer 550 being able to determine the unencrypted contents of the device-specific encrypted configurations or to reprogram the locked secure PLDs with alternative configurations. Secure PLD customer 510 may then audit the programmed and locked secure PLDs 410 in the corresponding user devices at downstream customer 550 without divulging the unencrypted contents of the device-specific encrypted configurations or unlocking the secure PLDs 410. Although shown in FIG. 5A as separate entities, secure PLD programmer 530 and user device assembler may be combined together and/or individually integrated with secure PLD customer 510, secure PLD manufacturer 520, and/or downstream customer 550.

Figure 5B:
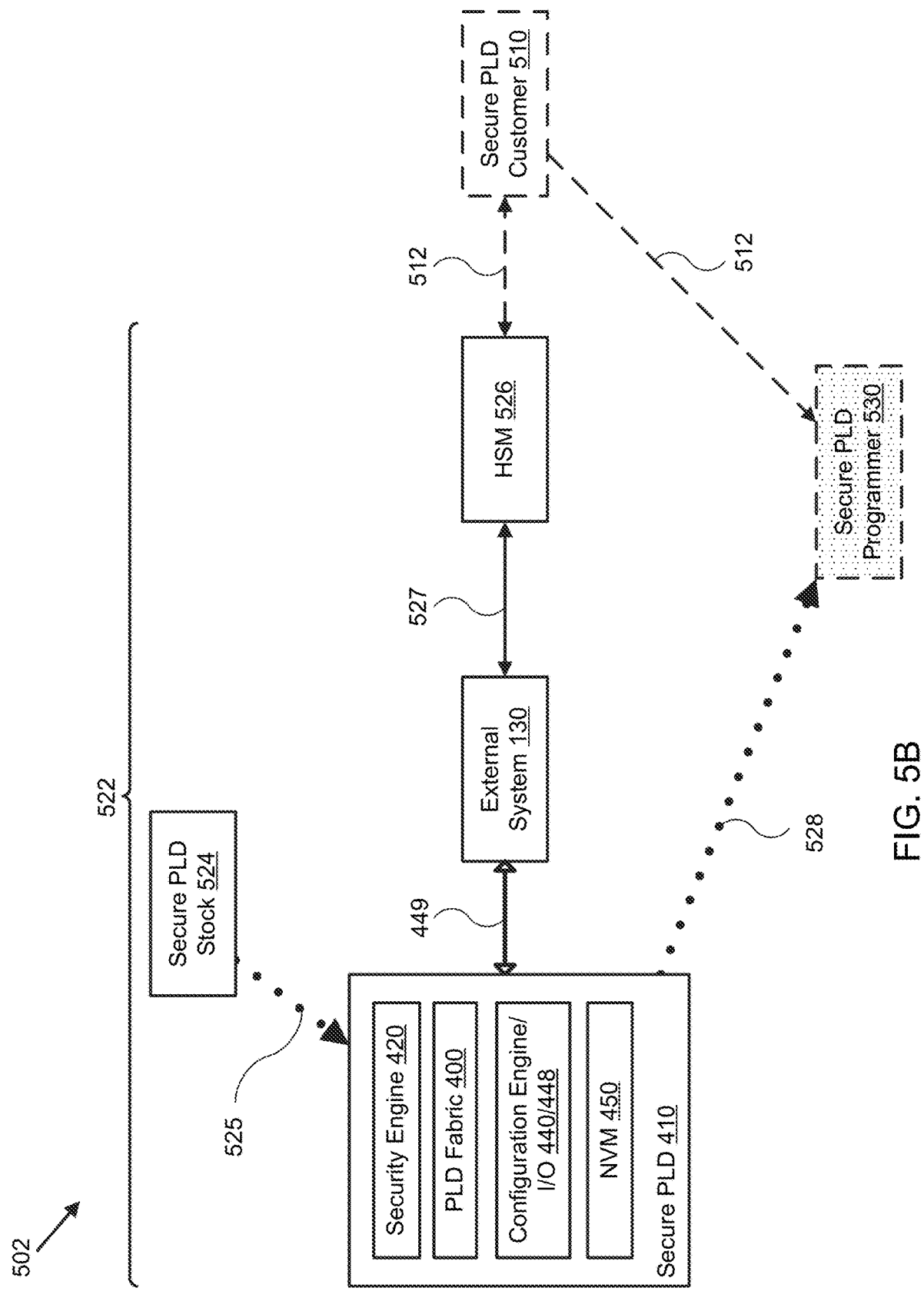
FIG. 5B illustrates a block diagram of a secure PLD provisioning system in accordance with an embodiment of the disclosure.

FIG. 5B illustrates a block diagram of a secure PLD provisioning system 502 in accordance with an embodiment of the disclosure. For example, one or more elements of provisioning system 502 may be configured to perform at least portions of the provisioning process described in relation to FIG. 7. In one embodiment, secure PLD provisioning system 502 may roughly correspond to secure PLD manufacturer 520 in FIG. 5A. More generally, a system similar to or including elements of secure PLD provisioning system 502 may be used to implement any one or multiple elements of secure PLD provisioning system 500 shown in FIG. 5A.

In the embodiment shown in FIG. 5B, secure PLD provisioning system 502 includes a secure PLD locking system 522 configured to lock and/or retarget a number of secure PLDs 410 sourced from secure PLD stock 524 (e.g., unlocked/blank secure PLDs 410 and/or previously locked secure PLDs 410 slated for retargeting to a different secure PLD customer or request) according to a request issued by secure PLD customer 510. Once locked by secure PLD locking system 522, locked secure PLDs may generally only be programmed with a configuration provided by secure PLD customer 510, such as by locking system 522 or, more generally, by secure PLD programmer 530, as described herein. In various embodiments, secure PLD locking system 522 may include a hardened security module (HSM) 526 configured to receive a customer public key from secure PLD customer 510 over unsecured communication link 512, for example, and control external system 130 via secure communication link 527 to lock secure PLD 410 provided over device delivery link 525 (e.g., a mechanical and/or electronic delivery link configured to retrieve secure PLD 420 from PLD stock/storage area 524 and interface configuration I/O 448 of secure PLD 410 with external system 130 via external bus interface 449). Locked secure PLDs 410 may then be physically delivered to secure PLD programmer 530 over a similar device delivery link 528. HSM 526 may generally be implemented similarly to external system 130, for example, but placed in a secure factory location with monitored and limited physical access to eliminate risk of external manipulation and/or monitoring of HSM 526. In some embodiments, external system 130 and HSM 526 and/or their functionality may be integrated into a single external system 130.

In general operation, secure PLD customer 510 may provide a request for a number of locked secure PLDs 410 to HSM 526 that includes a customer public key of a customer public/private key pair (e.g., generated within secure PLD customer 510, such as by its own HSM). HSM 526 may generate a customer-specific programming public/private key pair (e.g., used to encrypt, decrypt, and/or authenticate configurations for locked secure PLDs 410, such as to lock secure PLD 410 and unlock secure PLD 410 for programming) and a programming secret (e.g., a 256-bit random number word to further authenticate provided configurations) and provide the programming private key, the programming secret, and a factory public key to external system 130 for loading into and locking a blank or unlocked secure PLD 410. HSM 526 may be configured to generate the factory public/private key pair locally and/or retrieve such factory keys from memory 134, for example, and such factory keys may be factory-specific and/or customer-specific. Configuration engine 440 may receive a device-specific trace ID (e.g., which may identify a manufacturing batch, wafer, and wafer location corresponding to a fabrication process for secure PLD 410), the programming private key, the programming secret, the factory public key, and an initial programming image (IPI) configuration for PLD fabric 400, which may all be stored in one or more sectors of NVM 450 to lock secure PLD 410.

Configuration engine 440 may then store the trace ID in MFG trim 456 of NVM 450 and/or within device ID 422 of security engine 420 and generate a device unique seed by appending a random number (e.g., generated by TRNG 424) to the end of the trace ID, and such device unique seed may be stored within MFG trim 456 and/or used to seed generation of a device public/private key pair (e.g., generated by P/PKG 430 of security engine 420), which may be stored within device keys sector 458 of NVM 450. Configuration engine 440 may then provide the resulting device public key and trace ID to external system 130, which may relay the device public key and trace ID to HSM 526 to be added to a locked PLD manifest including a line item for each locked secure PLD 410 requested by secure PLD customer 510, where each line item includes the device-specific trace ID and device public key. HSM 526 may then encrypt and sign the programming secret using the customer public key and the programming private key, and the resulting encrypted programming packet may be provided to secure PLD customer 510 and accompanied by the programming public key (e.g., to help generate an encrypted and signed configuration for PLD fabric 400 of secure PLD 410). Once completed with entries for all locked secure PLDs 410 requested by secure PLD customer 510, HSM 526 may sign the locked PLD manifest using the programming private key and provide the signed locked PLD manifest to secure PLD customer 510, which can then use the locked PLD manifest, the programming secret, and the programming public key to manage programming of locked secure PLDs 410 by secure PLD programmer 530, as described herein.

In some embodiments, HSM 526 may be configured to generate a customer programming key token corresponding to a particular secure PLD customer 510 and/or the particular request for locked secure PLDs 410 received from secure PLD customer 510. Such customer programming key token may be used to reference (e.g., within a customer database stored in HSM 526) all information stored with respect to secure PLD customer 510 and/or the request for locked secure PLDs 410 received from secure PLD customer 510. Such stored information may include the programming public/private key pair, the programming secret, the factory public/private key pair, the locked PLD manifest, and/or other information or subsets of information associated with operation of secure PLD provisioning system 502 and/or 500. In embodiments where PLD stock 524 includes one or more previously locked secure PLDs 410 slated for retargeting (e.g., locking to a different secure PLD customer or different secure PLD request), HSM 526 may be configured to use a prior customer programming key token to retrieve the information used to lock the locked secure PLD, provide new information to secure PLD 410 (e.g., through external system 130) that is signed using the previous factory private key, and provide a retargeting command to secure PLD 410 (e.g., to be executed by secure PLD 410), where the retargeting command is executed by PLD fabric 400 and/or configuration engine 440 to authenticate the new information with the previous factory public key stored in NVM 450 and replace the previous information stored in NVM 450 (e.g., the device public/private key pair, the programming private key, the programming secret, the factory public key, and/or the IPI) with corresponding new or updated information.

Figure 6:
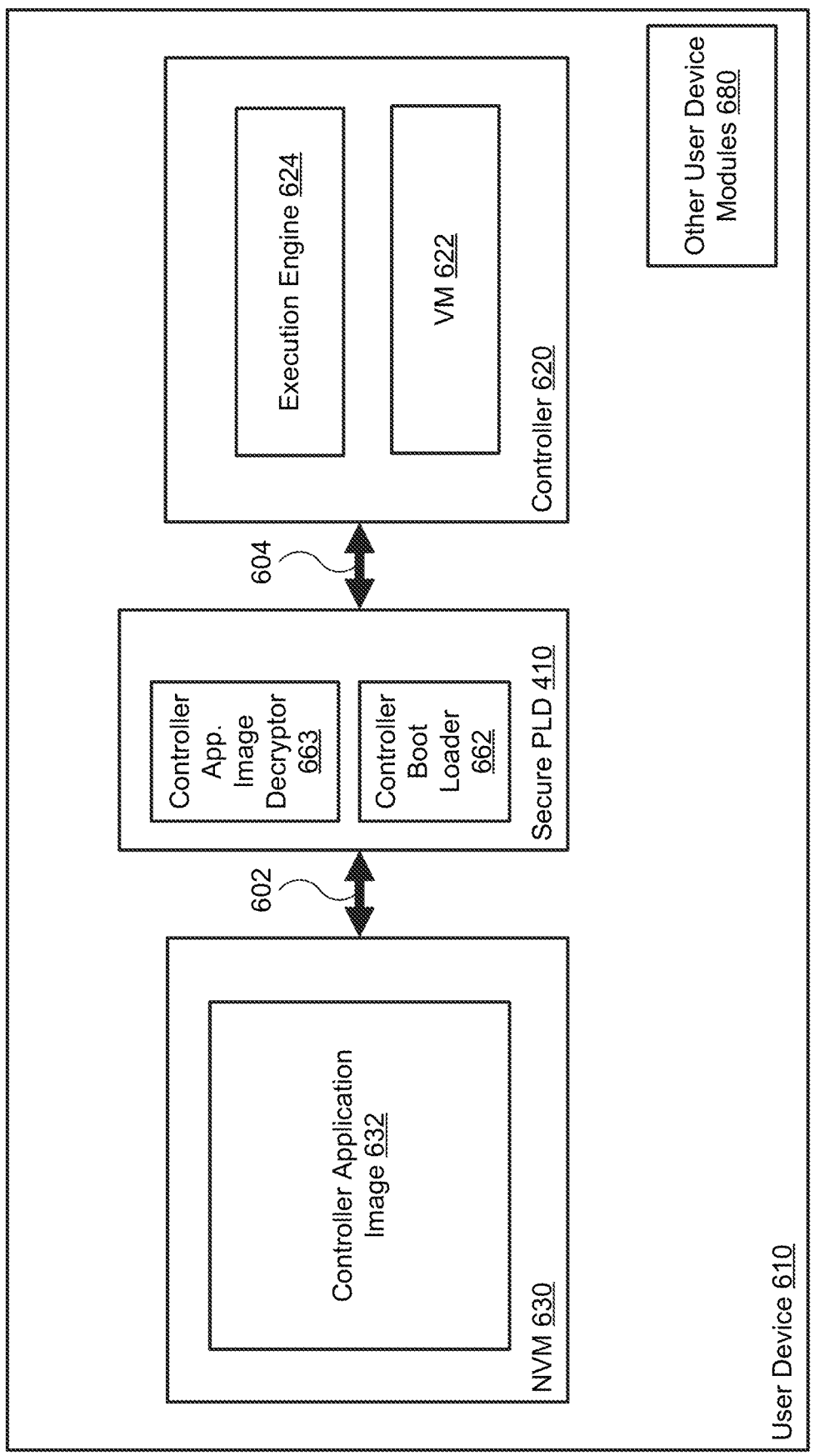
FIG. 6 illustrates a block diagram of a user device including a secure PLD in accordance with an embodiment of the disclosure.

FIG. 6 illustrates a block diagram of a user device 610 including secure PLD 410 in accordance with an embodiment of the disclosure. In one embodiment, secure PLD 410 may be configured to provide a secure boot mechanism for user device 610 (e.g., a motherboard, a smart phone, and/or other user/embedded devices). For example, at power on of user device 610, secure PLD 410 may be configured to use P/PKG 430 of security engine 420 to generate a temporary public/private key pair and to provide the temporary public key and a controller bootloader 662 (e.g., which may be pre-authenticated and/or stored in UFM 462 of NVM 450)) to controller 620 over bus 604 (e.g., a bus supported by programmable I/O 404). Execution engine 624 of controller 620 may be configured to execute controller bootloader 662 upon receiving it from secure PLD 410, which may configure execution engine 624 to generate a temporary session key (e.g., using power-on RAM values derived from a power-on state of volatile memory (VM) 612), to encrypt the temporary session key using the temporary public key provided by secure PLD 410 and a cryptographic salt, and to provide the resulting first encrypted package to secure PLD 410 over bus 604.

Secure PLD 410 may be configured to extract the temporary session key from the first encrypted package provided by controller 620 (e.g., using the temporary private key), to encrypt a controller application image decryptor 663 using the session key, and provide the resulting second encrypted package to controller 620 over bus 604. Execution engine 624 of controller 620 may be configured to extract controller application image decryptor 663 from the second encrypted package upon receiving it from secure PLD 410, which may configure execution engine 624 to retrieve, authenticate, and decrypt a controller application image 632 stored in NVM 630 (e.g., over buses 602 and 604), store the authenticated and decrypted controller application image 632 in VM 622, and execute the authenticated and decrypted controller application image 632. In addition, secure PLD 410 and controller 620 may be configured to register a secure communication path with each other.

In another embodiment, secure PLD 410 may be configured to verify a configuration used to program PLD fabric 400 of secure PLD 410, using controller 620. For example, secure PLD 410 may be configured to use P/PKG 430 of security engine 420 to generate a temporary public/private key pair and provide the temporary public key to controller 620. Execution engine 624 of controller 620 may be configured to generate a temporary session key, encrypt the temporary session key using the temporary public key provided by secure PLD 410 and a cryptographic salt, and to provide the resulting third encrypted package to secure PLD 410 over bus 604. Controller 620 may also be configured to use the session key to encrypt a request to extract identifying data from one or more configuration images stored in NVM 450 of secure PLD 410, for example, and to send the resulting fourth encrypted package to secure PLD 410 over bus 604.

Secure PLD 410 may be configured to extract the temporary session key from the third encrypted package provided by controller 620, use the temporary session key to extract the request from the fourth encrypted package, to extract the requested identifying data from the one or more configuration images stored in NVM 450 of secure PLD 410, to encrypt the requested identifying data using the temporary session key, and to provide the resulting fifth encrypted package to controller 620 over bus 604. Upon receipt, controller 620 may be configured to verify a version, release date, and/or other characteristics of the one or more configuration images stored in NVM 450 by comparison to a database of such characteristics residing in user device 610 (e.g., in NVM 630 or VM 622) and/or accessible over or retrieved from a network (e.g., communications network 514, accessed via other user device modules 680, which may include a network interface device). In further alternative embodiments, secure PLD 410 may take the place of controller 620 and be used to control operation of user device 600.

Figure 7:
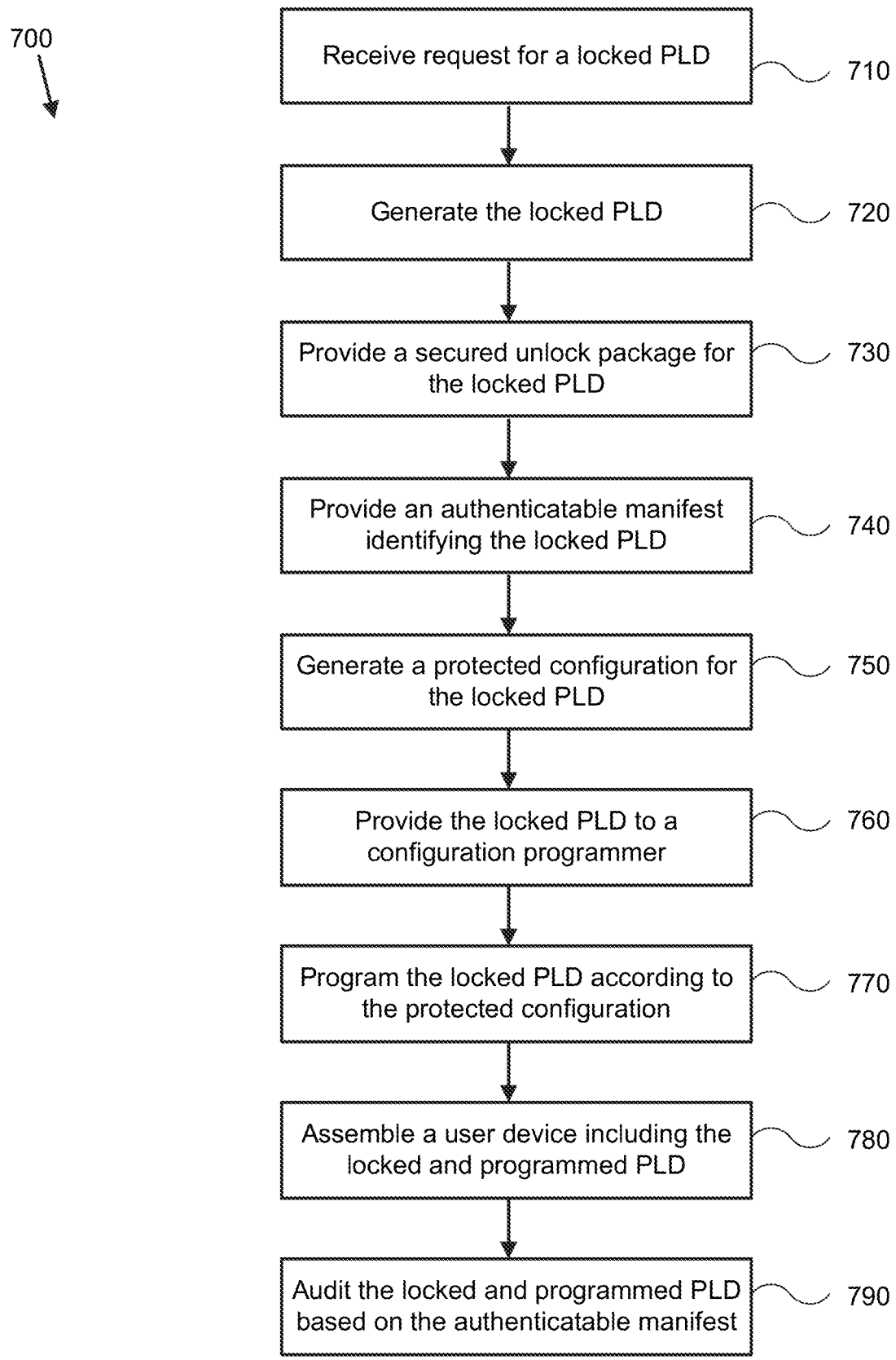
FIG. 7 illustrates a provisioning process for a locked secure PLD in accordance with an embodiment of the disclosure.

FIG. 7 illustrates a provisioning process for a locked secure PLD in accordance with an embodiment of the disclosure. In some embodiments, the operations of FIG. 7 may be implemented as software instructions executed by one or more logic devices associated with corresponding electronic devices, modules, and/or structures depicted in FIGS. 1-6. More generally, the operations of FIG. 7 may be implemented with any combination of software instructions and/or electronic hardware (e.g., inductors, capacitors, amplifiers, actuators, or other analog and/or digital components). It should be appreciated that any step, sub-step, sub-process, or block of process 700 may be performed in an order or arrangement different from the embodiments illustrated by FIG. 7. For example, in other embodiments, one or more blocks may be omitted from process 700, and other blocks may be included. Furthermore, block inputs, block outputs, various sensor signals, sensor information, calibration parameters, and/or other operational parameters may be stored to one or more memories prior to moving to a following portion of process 700. Although process 700 is described with reference to systems, devices, and elements of FIGS. 1-7, process 700 may be performed by other systems, devices, and elements, and including a different selection of electronic systems, devices, elements, assemblies, and/or arrangements. At the initiation of process 700, various system parameters may be populated by prior execution of a process similar to process 700, for example, or may be initialized to zero and/or one or more values corresponding to typical, stored, and/or learned values derived from past operation of process 700, as described herein.

In block 710, a logic device receives a request for a locked PLD. For example, a network communications device (e.g., external system 130, HSM 526) of secure PLD manufacturer 520 may be configured to receive a request for a locked secure PLD 410 from a network communications device (e.g., external system 130, HSM 526) of secure PLD customer 510. Such request may be transmitted over communication links 512 and/or through communications network 514, for example, and may include a customer public key of a corresponding customer public/private key pair, along with the number of devices requested and any specific model or other identifying information associated with a particular desired secure PLD 410.

In block 720, a logic device generates a locked PLD. For example, secure PLD manufacturer 520 may be configured to generate a locked secure PLD 410. In some embodiments, secure PLD manufacturer 520 may use an IC fabrication system to fabricate secure PLD 410, for example, which may include programming or storing or otherwise embedding device ID 422 in security engine 420 and/or MFG trim 456 of NVM 450. Secure PLD manufacturer 520 may also use external system 130 to lock secure PLD 410, as described herein. In one embodiment, secure PLD locking system 522 of secure PLD manufacturer 520 may be configured to assign a customer ID to secure PLD customer 510 and/or the request received in block 710, which may then be combined with device ID 422 and/or a device ordering part number (e.g., generated at manufacture) to provide a customer specific ordering part number that may be used to reference or identify secure PLD 410, such as in an unencrypted database stored in HSM 526.

HSM 526 may also be configured to generate a customer programming key token corresponding to secure PLD customer 510 and/or the customer public key in the request received in block 710 by generating a corresponding random and unique customer programming key token and/or a customer specific ordering part number and referencing all stored information related to generating locked secure PLDs referenced to such token or number. HSM 526 may also be configured to generate a programming public/private key pair and a programming secret, all specific to secure PLD customer 510 and/or the request received in block 710, all of which may be stored in HSM 526. HSM 526 may additionally be configured to generate a factory public/private key pair, which may be specific to secure PLD manufacturer 520, secure PLD customer 510, and/or the request received in block 710, which may also be stored in HSM 526.

HSM 526 may be configured to provide the factory public key, the programming private key, and the programming secret to external system 130 for programming/locking of secure PLD 410, for example, and to receive device-specific trace IDs and device public keys in return. HSM 526 may also be configured to encrypt and sign the programming secret using the customer public key and the programming private key, and the resulting encrypted programming packet may be provided to secure PLD customer 510 and accompanied by the programming public key (e.g., to help secure PLD customer 510 generate an encrypted and signed configuration for PLD fabric 400 of secure PLD 410). Secure PLD 410 may be configured to use TRNG 424 of security engine 420 to generate a device unique seed based on the trace ID stored in MFG trim 456 and/or device ID 422, and to use the device unique seed and/or P/PKG 430 of security engine 420 to generate a device public/private key pair, all specific to secure PLD 410, and all of which may be stored in NVM 450 (e.g., along with the programming private key, programming secret, factory public key, and/or an IPI configuration provided by external system 130 and/or HSM 526).

In another embodiment, HSM 526 may be configured to use the customer programming key token to retrieve the programming private key, the programming secret, and the device public key from a securely stored database and provide them to external system 130. External system 130 may then be configured to use the programming private key, the programming secret, and/or the device public key to provide an IPI configuration to secure PLD 410 and program PLD fabric 400 with the IPI. This programming may constitute an unsecure write operation and so may require a secure environment (e.g., taking place entirely within secure PLD manufacturer 520). In further embodiments, HSM 526 may be configured to receive a locked PLD manifest entry from external system 130 including a trace ID corresponding to secure PLD 410 and a corresponding device public key, to generate a complete locked PLD manifest corresponding to the request received in block 710, to sign the locked PLD manifest with the programming private key, and to provide the signed locked PLD manifest to secure PLD customer 510.

In additional embodiments, it may be useful to retarget an already programmed and locked secure PLD to a different customer or application (e.g., with a different programming key pair, programming secret, and public device key). Typically, an already programmed IPI need not be reprogrammed (e.g., the same IPI configuration for PLD fabric 400 may be used). For example, HSM 526 may be configured to use a customer programming key token and/or a trace ID to retrieve prior information (e.g., the original programming private key, programming secret, and device public key stored in HSM 526) used to lock secure PLD 410. HSM 526 may then be configured to use external system 130 to provide new information to secure PLD 410 that is signed using the previous factory private key, and provide a retargeting command to secure PLD 410 (e.g., to be executed by secure PLD 410), where the retargeting command may be executed by PLD fabric 400 and/or configuration engine 440 to authenticate the new information with the previous factory public key stored in NVM 450 and replace the previous information stored in NVM 450 (e.g., the device public/private key pair, the programming private key, the programming secret, the factory public key, and/or the IPI) with corresponding new or updated or retargeted information, as described herein.

In block 730, a logic device provides a secured unlock package for a locked PLD. For example, HSM 526 of secure PLD manufacturer 520 may be configured to provide a secured unlock package for the locked secure PLD 410 generated in block 720 to secure PLD customer 510. In one embodiment, HSM 526 may be configured to provide the encrypted programming packet, the programming public key, and/or the customer programming key token generated in block 720 to secure PLD customer 510. Such information may be used by secure PLD customer 510 to generate a protected configuration for secured PLD 410, as locked in block 720.

In block 740, a logic device provides an authenticatable manifest identifying a locked PLD. For example, secure PLD manufacturer 520 may be configured to provide an authenticatable locked PLD manifest identifying the locked secure PLD 410 generated in block 720. In one embodiment, HSM 526 may be configured to generate a manifest of trace IDs and device public keys (e.g., a manifest of device public keys referenced by trace ID), to sign the locked PLD manifest using the programming private key generated in block 720, and to provide the signed locked PLD manifest to secure PLD customer 510. Such information may be used by secure PLD customer 510 to audit a selection of deployed and/or locked secured PLDs 410.

In block 750, a logic device generates a protected configuration for a locked PLD. For example, an external system 130 of secure PLD customer 510 may be configured to generate a protected configuration for the locked secure PLD 410 generated in block 720. In one embodiment, external system 130 may be configured to generate an unprotected configuration for PLD fabric 400 of secure PLD 410 using a process similar to process 300 discussed with reference to FIG. 3. Such configuration may include an application bitstream/configuration to be primarily loaded into and configure PLD fabric 400, for example, and a feature bitstream/configuration to be primarily loaded into and configure lock policy sector 460, UFM sector 462, and/or other defined securable storage sectors 464. Such feature bitstream/configuration may include security keys, functions, and/or other features that may be executed and/or otherwise used by configuration engine 440 to implement any of the processes described herein.

In various embodiments, external system 130 and/or an HSM 526 of secure PLD customer 510 may be configured to generate an application public/private key pair, an application encryption key (e.g., an AES encryption key), and a programming packet public/private key pair. External system 130 may be configured to sign the application and feature configurations using the application private key and to encrypt the signed application and feature configurations using the application encryption key. External system 130 may also be configured to generate a programming key digest by signing a combination/list of the application public key, the application encryption key, and the programming secret (e.g., extracted from the encrypted programming packet of the secured unlock package provided in block 730) with the application private key, deriving an encryption key based on the programming public key and the programming packet private key (e.g., using an elliptic-curve Diffie-Hellman key derivation function), encrypting the signed combination of keys using the derived encryption key, and combining the encrypted and signed combination of keys with the programming packet public key (e.g., appending the programming packet public key to the encrypted and signed combination of keys) to create the programming key digest. External system 130 may also be configured to sign a locked PLD manifest (e.g., received in block 740) with the packet private key for authenticated delivery to a downstream secure PLD programmer 530, user device assembler 540, and/or downstream customer 550. External system 130 may be configured to generate a protected configuration for secure PLD 410 by combining the encrypted application and feature configurations with the programming key digest to create a single protected packet of information.

In block 760, a logic device provides a locked PLD to a configuration programmer. For example, secure PLD manufacturer 520 may be configured to provide the locked secure PLD 410 generated in block 720 to secure PLD programmer 530, as described herein.

In block 770, a logic device programs a locked PLD according to a protected configuration. For example, an external device 130 of secure PLD programmer 530 may be configured to program the locked secure PLD 410 generated in block 720 according to the protected configuration generated in block 750 and provided by secure PLD customer 510. In one embodiment, an external system 130 of secure PLD programmer 530 may be configured to provide the protected configuration/packet generated in block 750 to secure PLD 410, which may be configured to boot according to the IPI provided to secure PLD 410 in block 720. Secure PLD 410 may then validate the protected configuration and program elements of secure PLD 410, including PLD fabric 400 and portions of NVM 450, through one or more buses of secure PLD 410. More particularly, secure PLD 410 may be configured to decrypt the encrypted keys in the programming key digest using the programming private key stored in NVM 450 in block 720 and the packet public key generated in block 750. Secure PLD 410 may also be configured to authenticate the decrypted key digest with the application public key and verify that the programming secret in the programming key digest matches the programming secret stored in NVM 450 in block 720. If both checks pass, secure PLD 410 may store the application public key and application encryption key from the key digest in NVM 450.

Once the application public key and application encryption key from the key digest are stored in NVM 450, secure PLD 410 may then decrypt the application and feature configurations and authenticate the decrypted application and feature configurations. For example, the application and feature configurations may only be programmed into secure PLD 410 if the bitstreams are successfully decrypted and authenticated using the application encryption key and the application public key. In the event the application configuration is successfully authenticated, secure PLD 410 may be configured to program/store the application configuration into one of configuration image sectors 452 or 454, to set a pre-authentication bit for the appropriate image, to erase the IPI from PLD fabric 400, and/or to program PLD fabric 400 according to the stored application configuration. The feature configuration may be programmed into one or more portions of NVM 450. Other security checks to be performed prior to programming secure PLD 410 may include validating the locked PLD manifest, checking trace ID matching within the locked PLD manifest, and/or other security checks, as described herein.

In block 780, a logic device assembles a user device including a locked and programmed PLD. For example, a pick and place system of user device assembler 540 may be configured to assemble user device 610 including the locked secure PLD 410 generated in block 720 and programmed in block 770.

In block 790, a logic device audits a locked and programmed PLD based on an authenticatable manifest. For example, secure PLD customer 510 may be configured to audit the locked secure PLD generated in block 720 and programmed in block 770 based on the authenticatable locked PLD manifest provided in block 740. In one embodiment, an external system 130 of secure PLD customer 510 or downstream customer 550 may be configured to authenticate the locked PLD manifest provided by secure PLD manufacturer 520 or secure PLD customer 510 in block 740, query secure PLD 410 for its trace ID and/or device public key and compare to the trace ID and device public key in the locked PLD manifest, and to challenge secure PLD 410 using the device public key, such as by encrypting a random number using the device public key, providing the resulting encrypted package to secure PLD 410 in a device key challenge, and comparing the returned result to the original random number (e.g., a matching result indicates a successful audit of an operating secure PLD 410). Such auditing may in some embodiments take place prior to erasing the IPI configuration in block 770. Successful auditing indicates a functioning locked secure PLD 410.

Thus, by employing the systems and methods described herein, embodiments of the present disclosure are able to provide flexible and secure key provisioning and configuration of a secure PLD across a customer order of secure PLDs. A protected configuration of one customer cannot be used to program another customer personalized secure PLD or a blank secure PLD. Protected configurations may be programmed in-system or using an external device. Application keys may be decrypted only within a secure PLD. A customer may employ a key manifest to prevent device and/or application spoofing or over building. In various embodiments, programming keys and manifests are managed by one or more HSMs 526 of secure PLD manufacturer 520 and/or secure PLD customer 510.

To help reduce or eliminate risk of loss or extraction of a customer's or a manufacturer's PLD fabric configurations/images, keys, and/or other secured data from a locked or unlocked secure PLD 410, or reprogramming of such data, secure PLD 410 may implement one or more lock policy management mythologies according to a lock policy plan and/or other secure asset arrangement, for example, that may be used by PLD fabric 400, configuration engine 440, and/or other elements of secure PLD 410 to manage read, write, and/or erase access and enforce lock statuses with respect to assets of secure PLD 410. In the most general sense, secure PLD 410 may be configured to assign lock statuses to various assets of secure PLD 410, such as ports of configuration I/O 448 and/or sectors of NVM 450, and/or to groups of such assets, to protect locked and/or unlocked operation of secure PLD 410, as described herein. For example, access to such assets may be locked against external access (e.g., via configuration I/O 448), internal access (e.g., via PLD fabric 400), both external and internal access, and/or locked against any further access regardless of access type. Such access may be controlled granularly, such as providing read, write, and/or erase access per asset associated with NVM 450, for example, or read and/or write access (e.g., data communication access) across configuration I/O 448. Lock statuses associated with assets or groups of assets may be implemented by lock status bits configured to manage, store, or represent the read, write, and/or erase access according to a particular lock policy plan or arrangement, for example, which can be modified to provide a particular desired granularity of secure asset management for secure PLD 410.

Figure 8A:
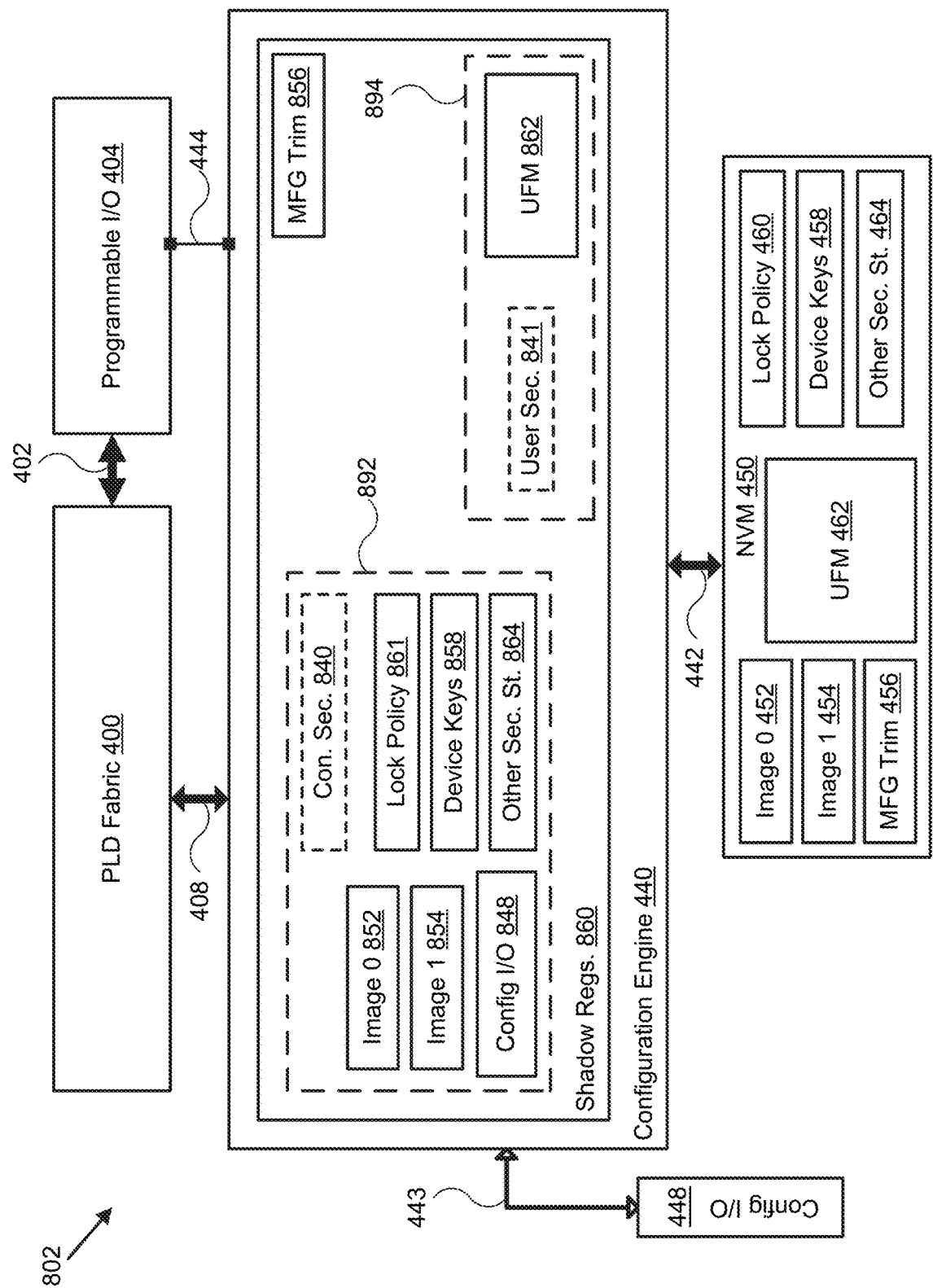
FIG. 8A illustrates a block diagram of a lock policy plan for a secure PLD in accordance with an embodiment of the disclosure.

FIG. 8A illustrates a block diagram of a lock policy plan 802 for secure PLD 410 in accordance with an embodiment of the disclosure. In various embodiments, lock policy plan 802 may be implemented by elements similar to those described with respect to secure PLD 410 in FIG. 4. In particular, lock policy plan 802 may be implemented by lock policy sector 460 and corresponding shadow registers 860 of configuration engine 440 to allow elements of secure PLD 410 (e.g., external system 130 over configuration I/O 448, configuration engine 440, PLD fabric 400, and/or other elements of secure PLD 410) to manipulate lock statuses of various elements of secure PLD 410.

For example, in the embodiment shown in FIG. 8A, shadow registers 860 includes configuration image lock statuses 852 and 854, configuration I/O lock status 848, lock policy lock status 861, device keys lock status 858, and other securable storage lock sectors 864 (e.g., associated with the corresponding sectors in NVM 450, configuration I/O 448, and/or external access bus 443) along with a configuration security lock status 841 in a boot lock status group 892, UFM lock status 862 (e.g., associated with corresponding UFM sector 462 in NVM 450) along with a user security lock status 840 in a user data lock status group 894, and MFG trim lock status 856. Each lock status of shadow registers 860 may be assigned its own individual LOCAL read, write/program, and/or erase access status, and each lock status group may be assigned its own GROUP read, write/program, and/or erase access status that operates to reduce access to all assets with lock statuses within the group, such that the group lock status can only override a more permissive local lock status within the group. More particularly, configuration security lock status 840 may represent a group lock status for boot lock status group 892, and user security lock status 841 may represent a group lock status for user data lock status group 894.

Each lock status may be implemented by one or more registers within shadow registers 860 of configuration engine 440, for example, that are configured to shadow corresponding lock statuses stored within lock policy sector 460 of NVM 450. In various embodiments, upon power up of secure PLD 410, configuration engine 440 may be configured to access lock policy 460, retrieve the various lock statuses from lock policy 460, and shadow the lock statuses within shadow registers 860 and according to lock policy plan 802 to allow the various lock statuses to be accessed and/or modified dynamically by configuration engine 440 and/or PLD fabric 400, depending on the settings/lock statuses in lock policy sector 460. In particular, configuration I/O lock status 848 may be configured to store or represent or indicate the read and/or write access status or statuses corresponding to one or more ports of configuration I/O 448 (e.g., JTAG, SSPI, I2C, and/or other ports or protocols supported by configuration I/O 448), which can be used to lock or unlock the individual ports to receive and/or provide data across configuration I/O 448 and/or external access bus 443. Lock policy lock status 861 may be configured to store or represent or indicate the read, write, and/or erase access status corresponding to lock policy sector 460 (e.g., which can act to lock or unlock access to all lock statuses stored in lock policy sector 460, such as a super group lock status). UFM 462 may include multiple individual and/or differentiated sectors or subsectors, for example, and so UFM lock status 862 may be configured to provide granular local lock statuses for each sector or subsector of UFM 462, and user security lock status 841 may be configured to provide a group lock status for user data lock status group 894, as described herein.

Read, write, and/or erase access and/or other lock statuses may be configured to provide interrelated access to sectors of NVM 450 to help provide secure access to such assets without risk of leakage of data within such assets. For example, a lock status bit may allow a sector of NVM 450 to be (1) erased but not read or written, (2) written or erased but not read, (3) read but not written or erased, or (4) neither read, written, nor erased, for example, or various combinations of these. For example, a particular lock status may allow a public or private key or an encryption key to be written but not read, or a configuration image sector to be erased but not read or updated and/or erased but not read, to help ensure customer and/or manufacturer data security and integrity. Each of these types of accesses may be set and/or controlled differently relative to or against external or internal access, as described herein.

Figure 8B:
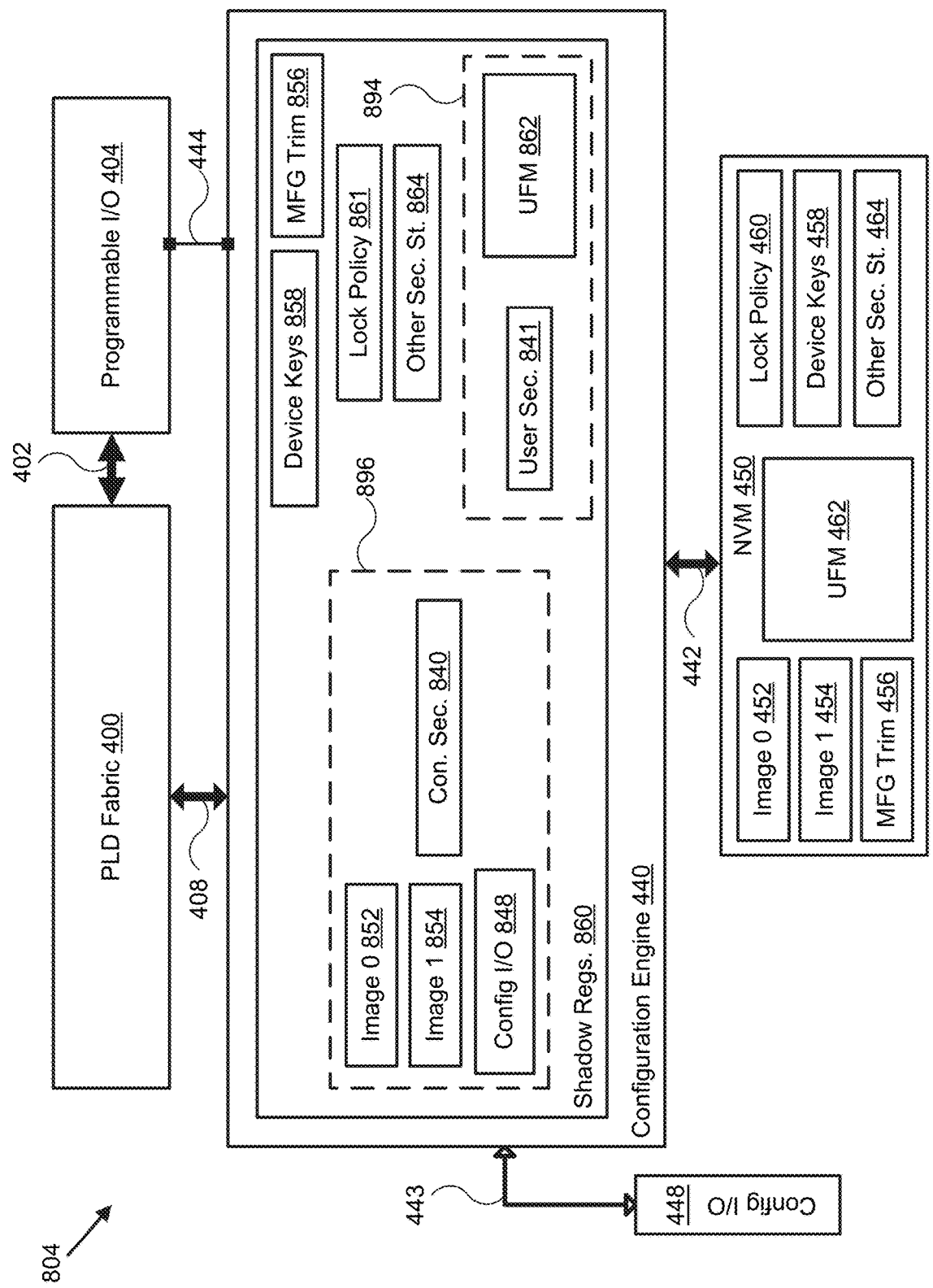
FIG. 8B illustrates a block diagram of a lock policy plan for a secure PLD in accordance with an embodiment of the disclosure.

FIG. 8B illustrates a block diagram of lock policy plan 804 for secure PLD in accordance with an embodiment of the disclosure. Lock policy plan 804 includes elements similar to those shown in lock policy plan 802 of FIG. 8A, except that the various lock statuses are arranged according to a different boot lock status group 896 that includes only configuration image lock statuses 852 and 854 and configuration I/O lock status 848 along with configuration security lock status 840 in boot lock status group 896, and lock policy lock status 861, device keys lock status 858, and other securable storage lock sectors 864 are ungrouped and thus subject to their local lock statuses and not to boot or user data group lock statuses, as shown. It should be understood that other lock policy plans with other groupings and/or non-groupings may be implemented using similar techniques to simplify lock policy operations, for example, or to provide varying levels of lock policy granularity.

FIGS. 9A-D illustrate access tables associated with corresponding lock policy plans for secure PLD 410 in accordance with embodiments of the disclosure. In particular, access table 902 shows the external bus and internal bus accessibilities associated with various lock statuses arranged according to lock policy plan 802. For example, access table 902 of FIG. 9A shows how lock policy plan 802, by grouping configuration I/O lock status 848 and configuration image lock statuses 852 and 854, can provide granular management of external and internal bus access to read, write/program, and erase configuration image sectors 452 and 454 in NVM 450. In such approach, internal access by PLD fabric 400 may be allowed or disallowed by setting one or more group and/or local lock status bits in configuration image lock statuses 852 and 854 and/or configuration security lock status 840, as shown, but, in the embodiment shown in FIG. 9A, such access also allows external access to configuration image sectors 452 and 454 (e.g., the soft lock portion of external bus and internal bus access are identical). In some embodiments, PLD fabric 400 and/or configuration engine 440 of secure PLD 410 and/or external system 130 may be configured to update configuration I/O lock status 848 (e.g., a local lock status) to lock configuration I/O 448 (e.g., block read and/or write access through configuration I/O 448) prior to adjusting lock status bits in configuration image lock statuses 852 and 854 and/or configuration security lock status 840 to allow internal access (e.g., read, write/program, erase) to configuration image sectors 452 and 454 without risking intervention or loss to an external system 130. As can be seen in access table 902, once hard lock for configuration image lock statuses 852 and 854 and configuration security lock status 840 is enabled, no further modification of the hard lock bit is allowed over configuration I/O 448/external bus 443 or by PLD fabric 400 over secure bus 408.

Access table 904 of FIG. 9B shows how a different lock policy plan/arrangement can provide differentiated granular management of external and internal bus access to read, write/program, and erase configuration image sectors 452 and 454 in NVM 450 (e.g., by not grouping configuration I/O lock status 848 and configuration image lock statuses 852 and 854). In such approach, external access by external system 130 over configuration I/O 448/external bus 443 may be allowed or disallowed by setting one or more group and/or local lock status bits in configuration image lock statuses 852 and 854 and/or configuration security lock status 840, as shown, but, in the embodiment shown in FIG. 9B, such access only applies to external access to configuration image sectors 452 and 454, and PLD fabric 400 has free access unless the hard lock for configuration image lock statuses 852 and 854 and configuration security lock status 840 is enabled, after which no further modification of the hard lock bit is allowed over configuration I/O 448/external bus 443 or by PLD fabric 400.

Access table 906 of FIG. 9C shows how a lock policy plan/arrangement including multiple types of soft lock (e.g., additional granularity as to external or internal or total soft lock) can provide differentiated granular management of external and internal bus access to read, write/program, and erase configuration image sectors 452 and 454 in NVM 450 (e.g., by adding an additional lock status bit, or a fabric write block (WB) bit, to enable or disable access specifically by PLD fabric 400). As shown in FIG. 9C, such approach includes aspects of both access tables 902 and 904, and fabric WB bit may itself be enabled or disabled by PLD fabric 400 and/or over configuration I/O 448/external bus 443, depending on the corresponding lock status in lock policy lock status 861. Such fabric WB bit may be configured to allow embodiments to prevent accidental internal modification of a configuration image or other data in NVM 450, for example.

As can be seen in access table 906, when the external soft lock is enabled (e.g., fabric WB bit is disabled), external access over configuration I/O 448/external bus 443 may be allowed or disallowed by setting one or more group and/or local lock status bits in configuration image lock statuses 852 and 854 and/or configuration security lock status 840, and PLD fabric 400 has free and open access to configuration image sectors 452 and 454. When the general soft lock is enabled (e.g., fabric WB bit is enabled), external access over configuration I/O 448/external bus 443, and internal access by PLD fabric 400, may be allowed or disallowed by setting one or more group and/or local lock status bits in configuration image lock statuses 852 and 854 and/or configuration security lock status 840, as shown. As with access tables 902 and 904, once hard lock for configuration image lock statuses 852 and 854 and configuration security lock status 840 is enabled, no further modification of the hard lock bit is allowed over configuration I/O 448/external bus 443 or by PLD fabric 400, and the status of the fabric WB bit no longer results in changes in lock statuses of configuration image sectors 452 and 454.

Access table 908 of FIG. 9D shows how a lock policy plan/arrangement including multiple types of hard lock (e.g., additional granularity as to external or internal or total hard lock) can provide differentiated granular management of external and internal bus access to read, write/program, and erase configuration image sectors 452 and 454 and/or other sectors in NVM 450, such as device keys sectors 458. As shown in FIG. 9D, such approach includes aspects of access tables 902, 904, and 906. For example, in the embodiment show in FIG. 9D, a corresponding lock policy plan/arrangement places device keys lock status 858 outside boot lock status group 892/896 and user data lock status group 894, similar to lock policy plan 804 in FIG. 8B. If no device key change is desired, policy 9 may be applied to lock device keys sector 458 from any internal or external access, and such application may permanently disable external access, for example, or permanently disable external and internal access (e.g., by blocking internal access to lock policy sector 460). If some restricted future device key change is desired, policy 6 may be applied to hard lock out external access to device keys sector 458 but allow PLD fabric 400 to adjustably access device keys sector 458, as shown.

For example, in one embodiment, PLD fabric 400 may be configured to receive a new configuration image over programmable I/O 404, decrypt and/or authenticate the new configuration image using a device key stored in device keys sector 458, and store the new configuration image in one of configuration image sectors 452 or 454 (and setting the authentication bit to indicate the stored new configuration image is bootable without necessitating another authentication process) and/or boot the new configuration image. Upon booting the new configuration image, PLD fabric 400 may be configured to set device keys lock status 858 to allow write and/or erase access to device keys sector 458 and/or UFM sector 462, to download new keys through a secure channel (e.g., established by PLD fabric 400 over programmable I/O 404), to write the new keys to UFM sector 462, to erase device keys sector 458, to copy the new keys from UFM sector 462 into device keys sector 458, to download an additional configuration image for PLD fabric 400, to decrypt and/or authenticate the additional new configuration image using the new keys, and to store the additional new configuration image in one of configuration image sectors 452 or 454 (and including setting the authentication bit to indicate the stored additional new configuration image is bootable without necessitating another authentication process) and/or boot the new configuration image. Such process allows embodiments to update keys and configuration images securely as part of a single or unified methodology.

In another embodiment, one "golden" configuration image for PLD fabric 400 may be stored permanently in configuration image sector 452 (e.g., as a known-good backup configuration for PLD fabric 400, with the corresponding hard lock enabled in configuration image lock status 852), and an updateable configuration image for PLD fabric 400 may be stored in configuration image sector 452 (e.g., with the corresponding hard lock disabled in configuration image lock status 854). For example, configuration image lock status 852 may be hard locked according to policy 9 in FIG. 9D, and configuration image lock status 854 may be soft locked according to policy 3 in FIG. 9D. In such embodiment, secure PLD 410 may be configured to update the configuration image stored in configuration image sector 454. For example, external system 130 may be configured to provide an unlock request (e.g., identifying the configuration image stored in configuration image sector 454) over configuration I/O 448 and through configuration engine 440 to PLD fabric 400, and PLD fabric 400 may be configured to receive, validate, and/or authenticate the unlock request, and to unlock configuration image sector 454 for programming by external system 130 and/or by PLD fabric 400 according to an updated configuration image provided by external system 130. PLD fabric 400 may also be configured to receive a lock request (e.g., identifying the updated configuration image stored in configuration image sector 454) from external system 130 over configuration I/O 448 and through configuration engine 440, and PLD fabric 400 may be configured to receive, validate, and/or authenticate the lock request, and to hard or soft lock configuration image sector 454 against further external access, as described herein.

In a further embodiment, both configuration image sector 452 and configuration image sector 454 can be updated with new configuration images provided by external system 130. For example, PLD fabric 400 may be configured to determine one configuration image sector to lock against external access (e.g., a most recent authenticated configuration image) and one configuration image sector to unlock for external access (e.g., a less recent and/or unauthenticated configuration image), for example, or external system 130 may be configured to provide selection criteria along with an unlock request to PLD fabric 400, all of which may be validated and/or authenticated by PLD fabric 400 before being acted upon. PLD fabric 400 may then allow update of the determine/selected configuration sector with an updated configuration image, authenticate the updated configuration image, and/or boot the authenticated updated configuration image. PLD fabric 400 may receive a lock request and proceed to hard or soft lock the appropriate configuration image sector against further external and/or internal read, write, and/or erase access after storage and authentication of the updated configuration image. In various embodiments, other lock statuses may be requested and/or selected for any of configuration image sectors 452 and 454, for example, and such selection may be sourced externally or internally relative to secure PLD 410.

In a further embodiment, secure PLD 410 may be implemented according to a lock policy plan designed to prevent in-transit attacks seeking to extraction or manipulation of data stored in NVM 450. For example, configuration image sectors 452 and 454 may both be locked against all external access but be configured to allow internal access, generally according to policy 3 as shown in FIG. 9D. Such policy prevents all tampering attempts of configuration image sectors 452 and 454 through configuration I/O 448. In various embodiments, PLD fabric 400 may be configured to establish a secure communication link with controller 620 (e.g., management control for a user device) upon power on of user device 610, for example, and/or otherwise authenticate controller 620, to receive an unlock request from controller 620 to unlock one or more ports of configuration I/O 448 and/or configuration image sectors 452 and 454, and to unlock such identified ports of configuration I/O 448 and/or configuration images accordingly. Once open, controller 620 may be configured to provide updated configuration images to configuration image sectors 452 and 454 and then relock configuration I/O 448 and/or configuration image sectors 452 and 454 via a lock request provided to PLD fabric 400.

Figure 10:
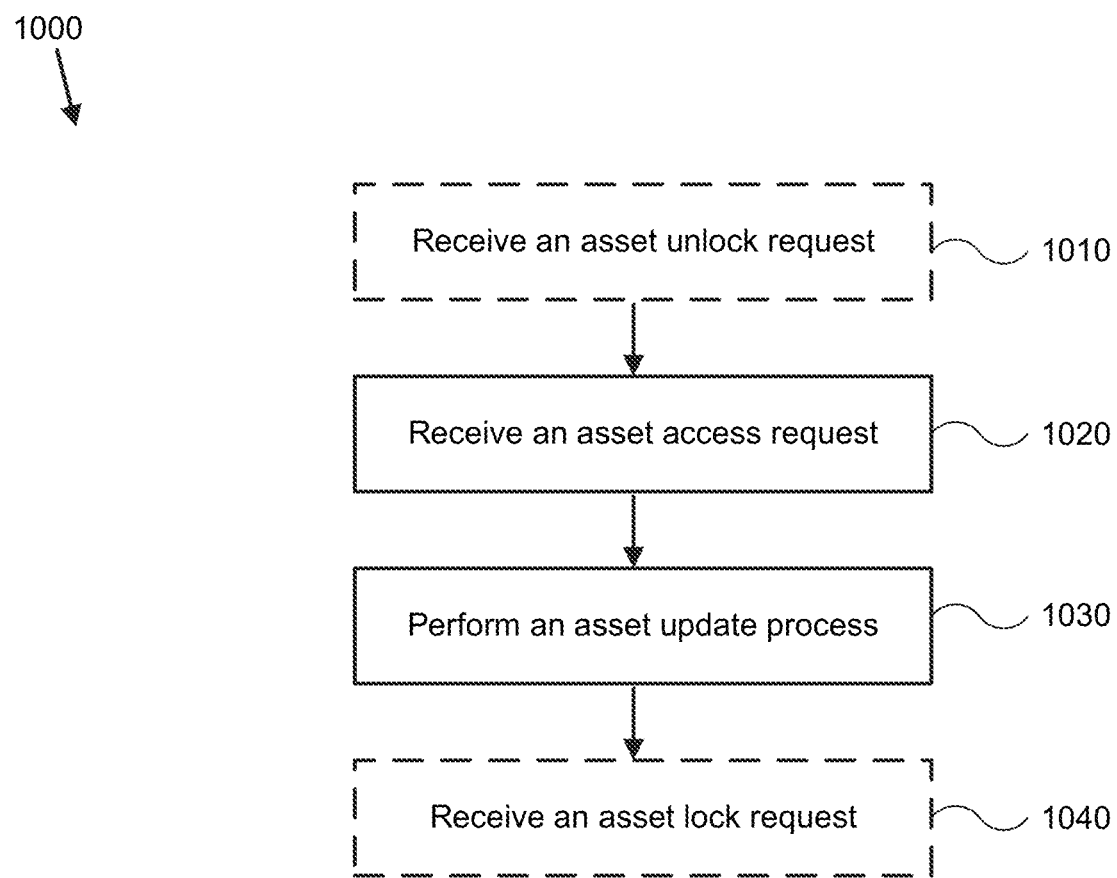
FIG. 10 illustrates an asset management process for a secure PLD in accordance with an embodiment of the disclosure.

FIG. 10 illustrates an asset management process 1000 for secure PLD 410 in accordance with an embodiment of the disclosure. In some embodiments, the operations of FIG. 10 may be implemented as software instructions executed by one or more logic devices associated with corresponding electronic devices, modules, and/or structures depicted in FIGS. 1-6. More generally, the operations of FIG. 10 may be implemented with any combination of software instructions and/or electronic hardware (e.g., inductors, capacitors, amplifiers, actuators, or other analog and/or digital components). It should be appreciated that any step, sub-step, sub-process, or block of process 1000 may be performed in an order or arrangement different from the embodiments illustrated by FIG. 10. For example, in other embodiments, one or more blocks may be omitted from process 1000, and other blocks may be included. Furthermore, block inputs, block outputs, various sensor signals, sensor information, calibration parameters, and/or other operational parameters may be stored to one or more memories prior to moving to a following portion of process 1000. Although process 1000 is described with reference to systems, devices, and elements of FIGS. 1-6, process 1000 may be performed by other systems, devices, and elements, and including a different selection of electronic systems, devices, elements, assemblies, and/or arrangements. At the initiation of process 1000, various system parameters may be populated by prior execution of a process similar to process 1000, for example, or may be initialized to zero and/or one or more values corresponding to typical, stored, and/or learned values derived from past operation of process 1000, as described herein.

In optional block 1010, a logic device receives an asset unlock request. For example, configuration engine 440 of a locked and/or programmed secure PLD 410 may be configured to receive a secure PLD asset unlock request issued by an external system 130 of secure PLD customer 510 or secure PLD manufacturer 520 coupled to secure PLD 410 over configuration I/O 448, for example, or issued by PLD fabric 400 running a customer or manufacturer configuration programmed into secure PLD 410 (e.g., using a process similar to that described with respect to process 700 of FIG. 7). In some embodiments, PLD fabric 400 may be configured to receive the secure PLD asset unlock request.

In various embodiments, such secure PLD asset unlock request may be signed, encrypted, and/or include additional information so as to enable secure PLD 410 to authenticate the secure PLD asset unlock request. In a specific embodiment, such secure PLD asset unlock request may include the trace ID of the specific secure PLD 410 being characterized (e.g., extracted from a locked PLD manifest provided by secure PLD manufacturer 520), and an external system 130 and/or HSM 526 of secure PLD customer 510 may be configured to sign such secure PLD asset unlock request using its application private key or a different private key, as described herein.

In some embodiments, configuration engine 440 and/or PLD fabric 400 may be configured to authenticate the secure PLD asset unlock request received in block 1010. In one embodiment, secure PLD 410 may be configured to authenticate a secure PLD asset unlock request signed by an application or other private key using an application or other public key stored in NVM 450 during a locking, programming, or other provisioning step in a provisioning process, as described herein. In another embodiment, secure PLD 410 may be configured to authenticate such secure PLD asset unlock request by comparing a secure PLD asset unlock request trace ID in the secure PLD asset unlock request with a trace ID stored in MFG trim sector 456 and/or other sector of NVM 450 or with device ID 422 of security engine 420, such that a matching trace ID in the secure PLD asset unlock request indicates an authenticated secure PLD asset unlock request. In further embodiments, such authentication process may include decrypting the secure PLD asset unlock request using a public key stored in NVM 450, as described herein.

In various embodiments, configuration engine 440 and/or PLD fabric 400 may be configured to unlock the secure PLD asset corresponding to the secure PLD asset unlock request after the secure PLD asset unlock request is received and/or authenticated. For example, configuration engine 440 and/or PLD fabric 400 may be configured to unlock the secure PLD asset by adjusting or updating a lock status in shadow registers 860 of configuration engine 440, which may then be stored in lock policy 460 of NVM 450, depending on the contents of corresponding lock policy lock status 861.

In block 1020, a logic device receives an asset access request. For example, configuration engine 440 and/or PLD fabric 400 of a locked and/or programmed secure PLD 410 may be configured to receive a secure PLD asset access request issued by an external system 130 of secure PLD customer 510 or secure PLD manufacturer 520 coupled to secure PLD 410 over configuration I/O 448, for example, or issued by PLD fabric 400 running a customer or manufacturer configuration programmed into secure PLD 410. In various embodiments, configuration engine 440 and/or PLD fabric 400 may be configured to authenticate such secure PLD asset access request prior to proceeding to block 1030.

In block 1030, a logic device performs an asset update process. For example, configuration engine 440 and/or PLD fabric 400 of a locked and/or programmed secure PLD 410 may be configured to perform a secure PLD asset update process corresponding to the secure PLD asset access request received in block 1020 and/or the secure PLD asset unlock request received in block 1010. In various embodiments, the performing the secure PLD asset update process may be based, at least in part, on a lock status associated with a secure PLD asset (e.g., one or more ports of configuration I/O 448 and/or sectors of NVM 450) corresponding to the secure PLD asset access request received in block 1020 and/or the secure PLD asset unlock request received in block 1010.

In various embodiments, configuration engine 440 and/or PLD fabric 400 may be configured to update one or more configuration images stored in configuration image sectors 452 and 454, for example, and/or UFM sector 462. In one embodiment, configuration engine 440 and/or PLD fabric 400 may be configured to receive a new configuration image over configuration I/O 448 (e.g., through configuration engine 440) and/or programmable I/O 404, to decrypt and/or authenticate the new configuration image using a device key stored in device keys sector 458, to determine a lock status associated with one of configuration image sectors 452 or 454 includes a write enable and/or an erase enable lock status, and to store the new configuration image in one of configuration image sectors 452 or 454 (e.g., while setting an authentication bit to indicate the stored new configuration image is bootable without necessitating an additional authentication process) and/or to boot the new configuration image.

Upon booting the new configuration image, PLD fabric 400 may be configured to set or update device keys lock status 858 to allow write and/or erase access to device keys sector 458 and/or UFM sector 462, to download/receive new keys through a secure channel (e.g., established by PLD fabric 400 over programmable I/O 404), to write the new keys to UFM sector 462, to erase device keys sector 458, to copy the new keys from UFM sector 462 into device keys sector 458, to download an additional configuration image for PLD fabric 400, to decrypt and/or authenticate the additional new configuration image using the new keys, and to store the additional new configuration image in one of configuration image sectors 452 or 454 (and including setting the authentication bit to indicate the stored additional new configuration image is bootable without necessitating another authentication process) and/or boot the new configuration image. In various embodiments, device keys lock status 858 may be updated to include a write disable and/or an erase disable lock status as against configuration I/O 448 and/or PLD fabric 400. Such process allows embodiments to update keys and configuration images securely as part of a single or unified methodology.

In another embodiment, configuration engine 440 and/or PLD fabric 400 may be configured to receive, validate, and/or authenticate an unlock request for a particular configuration image sector, and to unlock the particular configuration image sector for programming by external system 130 and/or by PLD fabric 400 according to an updated configuration image provided by external system 130. Configuration engine 440 and/or PLD fabric 400 may also be configured to receive a lock request (e.g., identifying the updated configuration image stored in configuration image sector 454) from external system 130 over configuration I/O 448 and through configuration engine 440, and configuration engine 440 and/or PLD fabric 400 may be configured to receive, validate, and/or authenticate the lock request, and to hard or soft lock configuration image sector 454 against further external access, as described herein.

In various embodiments, other securable assets of secure PLD 410 may be securely updated using similar techniques. For example, configuration engine 440 and/or PLD fabric 400 of secure PLD 410 may be configured to receive an updated MFG trim, trace ID, device keys, an IPI, and/or other data (e.g., issued/generated by an external system 130 and/or HSM 526 of secure PLD customer 510 or secure PLD manufacturer 520 coupled to secure PLD 410 over configuration I/O 448, for example, or over programmable I/O 404) configured to re-provision secure PLD 410 and/or place secure PLD 410 in condition to be re-provisioned using a process similar to provisioning process 700 of FIG. 7, thereby allowing secure PLD 410 to be placed in service with different or updated operational data.

In optional block 1040, a logic device receives an asset lock request. For example, configuration engine 440 and/or PLD fabric 400 of a secure PLD 410 may be configured to receive a secure PLD asset lock request issued by an external system 130 of secure PLD customer 510 or secure PLD manufacturer 520 coupled to secure PLD 410 over configuration I/O 448, for example, or issued by PLD fabric 400 running a customer configuration programmed into secure PLD 410. In various embodiments, configuration engine 440 and/or PLD fabric 400 may be configured to authenticate such secure PLD asset lock request prior to locking the asset according to a lock status included in the secure PLD asset lock request. For example, configuration engine 440 and/or PLD fabric 400 may be configured to lock the secure PLD asset by adjusting or updating a lock status in shadow registers 860 of configuration engine 440, which may then be stored in lock policy 460 of NVM 450, depending on the contents of corresponding lock policy lock status 861, as described herein.

In general, various blocks of process 1000 may be performed entirely by or within secure PLD customer 510, secure PLD manufacturer 510, and/or other elements of secure PLD provisioning system 500 and/or 502. In a specific embodiment, block 1030 may be performed by downstream customer 550 to update various elements of NVM 450 in-situ, such as while integrated with user device 610. More generally, block 1030 may be performed by secure PLD customer 510, secure PLD manufacturer 520, secure PLD programmer 530, user device assembler 540, and/or downstream customer 550 at any time during the operational lifetime of secure PLD 410 and/or user device 610.

Thus, by employing the systems and methods described herein, embodiments of the present disclosure are able to provide flexible and secure asset management for a secure PLD. A customer locked and/or otherwise provisioned secure PLD may be securely erased and/or updated without risking exposure of customer data. Moreover, the secure PLD may be securely re-provisioned according to updated customer data, for example, or according to a new customer application, without requiring the secure PLD be orphaned or otherwise destroyed.

Authentication of a configuration image using an asymmetric key encryption/authentication scheme (such as RSA or ECDSA) (referred to herein as "authentication" for simplicity) is one way to increase security for devices, including to enable validated and secure device booting. Secure device booting is an important element in providing a complete stack of secure functionality, from a hardware root of trust through secure application layer security. For example, authentication of configuration images is helpful to ensure that a configuration image hasn't been modified in transit. While some devices have relatively small firmware images, some devices have much larger and more complex images. For example, a PLD fabric of secure PLD 410 can have a very large configuration image.

For many PLDs, authentication can be computation intensive and induce a large delay in booting time. For example, a 30K FPGA has approximately six million configuration bits and would typically (assuming a 150 MHz clock) require about 10 ms to write a configuration image into the PLD fabric without any authentication. In some embodiments, a PLD may have no onboard non-volatile memory or may otherwise be configured to read a configuration image from an external non-volatile memory. It could be relatively easy to subvert such external non-volatile memory with an unauthorized configuration bitstream, as so authenticating the configuration bitstream can be an important feature for a system where security is an important attribute. However, authentication with ECDSA could add approximately seven million cycles of computation, which would take an additional 50 ms to finish under the same scenario. Thus, providing authentication for such PLD could increase boot time by about 5× in such a scenario, which can present a large performance penalty. Even when a PLD includes onboard non-volatile storage for a configuration image, it should not be assumed that the configuration image is valid simply because it is stored on the chip.

In various embodiments, secure PLD 410 may include sufficient on-board non-volatile storage (e.g., NVM 450) for multiple on-die configuration images. In some usage models of such a capability, there is a need to boot from last known good image until an updated image has been validated, or to attempt to boot from a latest image, and but use an older image as secure back up in case the latest image booting fails. Such functionality allows a seamless in field system upgrade in which a device is much less likely to be "bricked" in the field by a remote update. Customers/users/managers also need a reliable method to obtain authenticated information about which configuration image is being used by secure PLF 410 and the security status of secure PLD 410 and/or the configuration image.

In some embodiments, secure PLD 410 may be configured to conduct a dry run on configuration data or image that is received, the dry run including performing at least a check for integrity of the configuration data (e.g., that the configuration image is complete and has not inadvertently been truncated or damaged in transit). The dry run also can include authenticating a source of the configuration data, using a variety of techniques described herein, including the provisioning and asset management techniques described herein. The dry run also can include performing other validity checks on the configuration data that relate to architectural specifics or other requirements imposed by secure PLD 410 itself. The configuration data can be obtained from an external port, which can receive it from a flash memory, or from a network interface for example. In some implementations, the configuration data can be stored before the dry run occurs, but a flag or status may be set to allow or prevent usage of that configuration data for actually configuring the PLD (e.g., PLD fabric 400). Depending on an approach for the integrity check, the integrity check can be conducted while the data is being received, or it can be performed after an entire image is received. In some embodiments, both authentication and integrity can be verified using any one or combination of protocols described herein. The configuration data may be encrypted or unencrypted in transit and/or while stored. If encrypted, the integrity check may be performed on the encrypted data. In various embodiments, secure PLD 410 includes security engine 420, which may be configured to implement cryptographic primitives, and may also be able to generate asymmetric key pairs, and/or random numbers for use in various encryption/authentication and/or communication schemes.

For example, secure PLD 410 may be configured to provide a public key that it generates to a source of configuration data (e.g., secure PLD customer 510), and that source of configuration data may use that public key to encrypt configuration data, and other data, such as an HMAC of the configuration data, to be returned to secure PLD 410. The HMAC may be signed by a private key of the source, and the public key of the source may also be provided to secure PLD 410, which can use the public key in authenticating the source of the configuration data package. In some implementations, authentication of a configuration data source can be required before integrity checks. Some implementations require that the authentication and integrity check be conducted atomically—meaning that in the context of secure PLD 410, the portions of secure PLD 410 participating in the authentication and integrity check are not handling any other intervening tasks, participating in I/O, for example. Secure PLD 410 may also undertake obfuscatory countermeasures against side-channel attacks. Other approaches to configuration data integrity, source authentication, and privacy of the configuration data may be implemented.

Once the relevant authentication, integrity, and/or validity checks have been passed, then secure PLD 410 can set a flag or status that allows the configuration data, as stored in secure PLD 410 itself, to be used for configuring or programming PLD fabric 400 henceforth. The area or sector within NVM 450 storing the configuration data may be set to not allow write operations. Some implementations may allow reads of the configuration data, while some may disallow all access (e.g., except by configuration engine 440, for example). If permissions are set to again allow a write to any memory location storing previously-verified configuration data, the pre-authentication flag or status can be cleared, meaning that the configuration data is no longer considered pre-authenticated or available for use in programming PLD fabric 400. The clearing of the flag could occur atomically with the change in permissions to the memory locations. If there is a command or other situation where such configuration data is indicated for use, then the authentication and integrity checks must again be performed. Configuration data/images may be stored encrypted or unencrypted. Security engine 420 may decrypt the configuration data as it is read out from NVM 450 in order to configure portions of the PLD.

While some implementations may provide one or more complete images of configuration data, such that secure PLD 410 is configured from one image, other implementations may allow partial configuration or reconfiguration of secure PLD 410. In such situations, secure PLD 410 may further implement an authorization framework, in which a particular portion of configuration data can authorized to configure a particular portion of secure PLD 410. While some implementations may provide a programmable logic fabric, which are configured by configuration data, the elements and actions disclosed herein also can be applied to firmware or software provided to a secure PLD which includes a processor (e.g., other IC modules 480) that can execute instructions, such as a RISC core. Such approaches also can be applied to settings data that may be provided for hard functional blocks in the secure PLD. As such, it should be understood that a secure PLD is not simply or only a programmable logic portion of a device or system, in that some implementations may provide integration of other functional elements for which these authentication, integrity, and/or authorization checks can be conducted.

Some implementations may further provide a capability to have multiple distinct boot images, and in them, should a dry-run fail, then another image, which has already been validated may be selected for use. In a case where there are two images, a boot or initialization process can include determining which images are flagged as validated, and then determining which of the flagged images is most recent. Series or recency information can be provided by a source of configuration data, or can be generated by secure PLD 410, or both. For example, a source can maintain a monotonically increasing counter that identifies each image version. In many situations, there would be only one source of configuration data for secure PLD 410, and so it would be straight forward to maintain such information. In various embodiments, a "dry run" or pre-authentication process can be conducted for a bitstream that is received, and this dry run can include verifying a source (such as through a certificate or private key mechanism) of the bitstream, as well as conducting integrity checks on the bitstream (such as whether it was modified—such modifications can have occurred by intent or by accident—such as by an attempt to compromise the bitstream, or by transmission errors, for example). These features can be accomplished by different combinations of implementations. For example, in one embodiment, secure PLD 410 may be configured to generate public/private key pairs and can therefore provide a public key to a source of a bitstream, and that source can encrypt data to be transmitted back to secure PLD 410 using that public key. Such public key could be exchanged using a key exchange algorithm or could be extracted from secure PLD 410 during initial configuration. Such public/private key pair could be updated or renewed in a deployed device. Such data can include a keyed Hash Message Authentication Code (HMAC) of a bitstream, for example. While an unkeyed hash can provide indicia of bitstream integrity, a keyed HMAC, such as keying the hash with the private key of the source, provides authentication given that secure PLD 410 can use the public key of the source to authenticate. It may also be the case that a shared secret key can be used to key the hash.

In some implementations, the bitstream may be encrypted, and if so the HMAC can be over the unencrypted or encrypted bitstream, although it may be preferred that the HMAC is over the encrypted bitstream. The bitstream may be encrypted with a symmetric key that is a shared secret with between the bitstream source and secure PLD 410. The symmetric key may be provided to secure PLD 410 encrypted using the public key provided by secure PLD 410. In other implementations, a shared secret key may be supplied to secure PLD 410 via a secure communication channel, and/or in a secure facility. In such situations, the shared secret key may be used to encrypt a hash of the bitstream, for decryption and comparison in secure PLD 410. The bitstream itself may or may not be encrypted. Other implementations may use an approach to encryption that integrates an authentication mechanism. Depending on choice of encryption and authentication approaches, an initialization vector or nonce may also be required for initializing or salting the HMAC.

In an example, a method for secure loading of configuration data in a programmable logic device provides for a configuration source to encrypt, using a symmetric secret key, configuration data (a bulk encryption). Then, a message authentication protocol (e.g. a hash) is performed on the encrypted configuration source to generate a cleartext signature. That cleartext signature is encrypted with a public key of the programmable logic device. The symmetric secret key may be included in that encrypted package. Secure PLD 410 receives the bulk encrypted configuration data and the encrypted package. It decrypts using its private key corresponding to the public key, the encrypted package to obtain the cleartext signature and optionally the symmetric key. Secure PLD 410 hashes the received bulk encrypted configuration data to generate a second hash and compares that with the cleartext signature. If there is a match, then secure PLD 410 can trust the authenticity of the configuration data and can store it in encrypted form, along with the symmetric key, or can decrypt and store the configuration data. Secure PLD 410 conducts, at this time, other pre-use checks on the configuration data, but does not actually configure secure PLD 410 with the configuration data. After passing the pre-use checks and determining that the produced and received hashes match, secure PLD 410 sets a status or flag that indicates that the configuration data/image has been pre-authenticated. Therefore, when the configuration data is to be used to configure secure PLD 410, it can be loaded without regenerating the hash and performing the comparison.

In another example, a digest or hash of the configuration data can be signed by the private key of a source of the configuration data. The configuration data itself can be encrypted or unencrypted (and the digest can be over the encrypted or cleartext data, although it is preferred to be taken over the encrypted data). If encrypted, the encryption may be a bulk encryption that uses a symmetric key that is shared with secure PLD 410 by encrypted it with a public key corresponding to a private key held by secure PLD 410. The private key can be unique to secure PLD 410 or can be shared among a number of secure PLDs.

A method of securely loading configuration data in secure PLD 410 may include hashing using a hash function (e.g., SHA256) configuration data to generate a first digest; encrypting using a private key corresponding to a first public/private key pair (e.g., using an elliptic curve algorithm) the first digest to generate a signature for the configuration data; encrypting, using a symmetric key and a symmetric key encryption algorithm (e.g., AES), the configuration data, the signature and the public key corresponding to the first public/private key pair into an encrypted payload; transferring the symmetric key to secure PLD 410 either via a secure channel or at a secure location, the symmetric key being stored in the programmable logic device; transferring the encrypted payload to the programmable logic device; decrypting in the programmable logic device, using the symmetric key and a symmetric key decryption algorithm corresponding to the symmetric key encryption algorithm, the encrypted payload to obtain the public key, the signature and the configuration data; decrypting, using the public key, the signature to obtain the first digest; hashing, using the same hash function, the configuration data to generate a second digest; comparing the first digest and the second digest to determine whether the configuration data is valid; and allowing the configuration data to be used to configure programmable logic in secure PLD 410 in response to the determining that the configuration data is valid.

A method of securely loading configuration data in secure PLD 410 may include receiving, in secure PLD 410, configuration data and signature data; hashing, using a hash function (e.g., SHA256) the configuration data to generate a first digest; decrypting, using a private key stored in the PLD, the signature data to obtain candidate digest data; comparing the candidate digest data with the first digest; responsive to the candidate digest data matching the first digest, determining that the received configuration data is valid; responsive to determining that the received configuration data is valid, setting a flag in a secure location of the PLD indicating that the received configuration data is valid.

An article of manufacture (e.g., secure PLD 410) including PLD fabric 400 and NVM 450 of a size large enough to store at least two configuration images for PLD fabric 400, and security engine 420 capable of producing a hash of a configuration image, as the configuration image is streamed to an input port, and any one or more of the following: capable of storing encrypted configuration images and decrypting a configuration image on the fly when using the configuration image to configure the programmable logic fabric; comparing the produced hash of the received configuration image with a signature of the configuration image, which is provided via an authenticated communication mechanism; maintaining a current configuration of the programmable logic fabric, verifying the hash of the received image by comparing with the signature, and applying the received configuration to the programmable logic fabric if the comparison validates the configuration image. Secure PLD 410 may also be configured to revert to a last known good configuration image if the newly applied configuration image fails to operate or upon command from an external authenticated source; include an internal bus to control access to NVM 450. In some embodiments, a portion of a current configuration determines which configuration image to use, in circumstances where two or more images have been validated. In some lock modes, PLD fabric 400 responds to properly authenticated external lock and unlock requests in one or more lock modes and can be configured to not respond to any external unlock request. Non-volatile key memory (e.g., memory storing private key that is used to authenticate chip communications) can be locked independently of configuration images. For example, a new config can be downloaded and validated with old key; to update keys, new private key for device is authenticated by private key of master and encrypted by existing public key of secure PLD 410. It may then be decrypted by a private key of secure PLD 410 and authenticated by a public key of a source.

A method of securely loading configuration data in a programmable logic device may include hashing using a hash function (e.g., SHA256) configuration data to generate a first digest; encrypting using a private key corresponding to a first public/private key pair (e.g., using an elliptic curve algorithm) the first digest to generate a signature for the configuration data; encrypting, using a symmetric key and a symmetric key encryption algorithm (e.g., AES), the configuration data, the signature and the public key corresponding to the first public/private key pair into an encrypted payload; transferring the symmetric key to secure PLD 410 either via a secure channel or at a secure location, the symmetric key being stored in the programmable logic device; transferring the encrypted payload to the programmable logic device; decrypting in the programmable logic device, using the symmetric key and a symmetric key encryption algorithm corresponding to the symmetric key encryption algorithm, the encrypted payload to obtain the public key, the signature and the configuration data; decrypting, using the public key, the signature to obtain the first digest; hashing, using the same hash function, the configuration data to generate a second digest; comparing the first digest and the second digest to determine whether the configuration data is valid; and allowing the configuration data to be used to configure programmable logic in secure PLD 410 in response to the determining that the configuration data is valid.

The symmetric key may be provided to secure PLD 410 in a secure environment and is stored in one-time programmable memory in the programmable logic device. Secure PLD 410 may be associated with a second public/private key pair, and the private key for the second public/private key pair may be securely provided in the programmable logic device, and the public key for the second public/private key pair may be used to encrypt the symmetric key for provision to the programmable logic device, and secure PLD 410 may decrypt the symmetric key using the private key for the second public/private key pair and store the private key in the programmable logic device. Secure PLD 410 may include a module for generating public/private key pairs, generating the second public/private key pair, and providing the public key from secure PLD 410 for use in encrypting the symmetric key. A programmable logic device may include memory capable of storing a first and a second complete configuration images for completely programming a programmable fabric of the programmable logic device, where a portion of the memory may be also capable of storing user data, that may also be readable by the programmable fabric. Secure PLD 410 may be configured to boot from the first configuration image as an active boot image while the second configuration image is updated and perform an integrity check on the second configuration image, and secure PLD 410 may be configured, responsive to the second configuration image being valid, to switch the active boot image to the second configuration image.

A secure boot system may include a generator or source for a bitstream used to configure PLD fabric 400 and secure PLD 410, where the generator or source includes a private key for a first public/private key pair, and secure PLD 410 stores the public key for the first public/private key pair, the generator being operable to generate a hash of the bitstream and encrypt the hash of the bitstream with the private key, secure PLD 410 being operable to decrypt the hash, and to generate a hash using the same hashing algorithm as the generator, and compare the decrypted hash with the generated hash in order to validate a bitstream received by secure PLD 410, before using the received bitstream to configure secure PLD 410. Both the generator and secure PLD 410 may store a symmetric key, and the generator uses the symmetric key to encrypt the bitstream, and secure PLD 410 uses the symmetric key to decrypt the bitstream, before generating the hash.

FIGS. 11A-C illustrate secure boot processes 1100, 1102, 1104 for secure PLD 410 in accordance with an embodiment of the disclosure. In particular, secure boot process 1100 of FIG. 11A illustrates a relatively slow secure boot process that includes configuration engine 440 of secure PLD 410 authenticating a configuration image (e.g., configuration image 0 in sector 452 of NVM 450 in FIG. 4) for every boot of PLD fabric 400 prior to initializing PLD fabric 400 (e.g., sending a "wake up" signal to PLD fabric 400 before entering normal operation in the user stage). Secure boot process 1102 of FIG. 11B illustrates a relatively efficient and fast secure boot process in which configuration engine 440 of secure PLD 410 performs a pre-authentication process 1120 once to determine pre-authentication status and/or set the status to a valid status, and then performs a relatively fast secure boot process 1122 to boot PLD fabric 400 relatively quickly and without performing a full and resource intensive authentication of the configuration image. Secure boot process 1104 of FIG. 11C illustrates the relatively fast subsequent secure boot process 1132 where configuration engine 440 of secure PLD 410 simply boots PLD fabric 400 and enters normal operation without performing a full authentication of the configuration image.

In various embodiments, pre-authentication process 1120 may be a secure procedure launched using a single command provided to or generated by configuration engine 440, which may include reading a configuration image (e.g., from NVM 450 and/or over config I/O 448 or programmable I/O 404), and providing the configuration image to an authentication engine (e.g., implemented in configuration engine 440, security engine 420, or a combination of those and/or other IC modules 480) configured to determine a pre-authentication status associated with the received configuration image (e.g., configuration image 0 of sector 452). Such status may be implemented, at least in part, as a flag or status bit (e.g., associated with sector 452, similar to various techniques for asset management, as described herein) configured to protect the configuration image from erasing, overwriting, and/or unauthorized access. If such flag or status bit is set (e.g., the status includes a "valid" status), configuration engine 440 may be configured to perform fast secure boot process 1122 and/or fast subsequent secure boot process 1132. If such flag or status bit is not set (e.g., the status includes an "invalid" status), configuration engine 440 may be configured to halt booting of the configuration image or boot PLD fabric 400 according to a different, valid configuration image (e.g., configuration image 1 of sector 454). Pre-authentication process 1120 may be performed on configuration images stored in NVM 450, stored on an external memory 136 and accessed over configuration I/O 448 and/or programmable I/O 404, or streamed over various I/O buses, including configuration I/O 448 and/or programmable I/O 404.

In related embodiments, pre-authentication process 1120 may include determining a design version corresponding to the configuration image and/or determining a pre-authentication digest or hash of the configuration image (e.g., for relatively quick comparison before booting), in addition to providing the configuration image to an authentication engine and/or storing an associated authentication engine result, as described herein. In alternative embodiments, an authentication engine implemented by configuration engine 440 and/or security engine 420 may be configured to authenticate the configuration image (e.g., using various encryption/signing schemes), determine a version of the configuration image, generate a digest or hash of the configuration image (e.g., for relatively quick comparison before booting), determine the configuration image includes a complete configuration image for secure PLD 410, and/or validate the configuration image with respect to secure PLD 410 (e.g., verify that the configuration is meant for the particular selection of components implemented and/or integrated with secure PLD 410). In various embodiments, the authentication engine result must be a pass result (e.g., all checks must be passed) in order for the pre-authentication status to be a valid status.

Figures 12A, 12B:
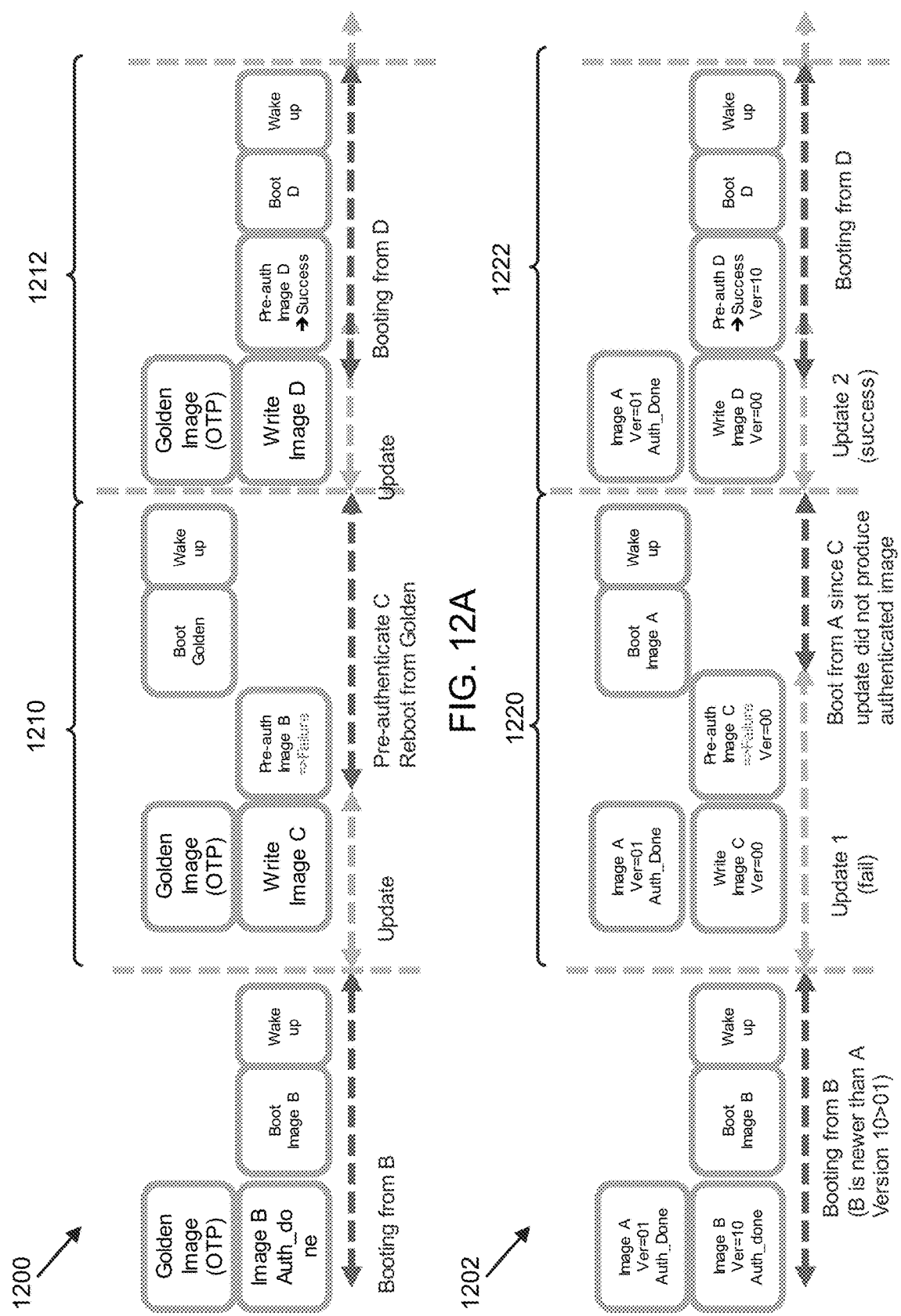
FIGS. 12A-B illustrate secure boot processes for a secure PLD in accordance with an embodiment of the disclosure.

FIGS. 12A-B illustrate secure boot processes 1200, 1202 for secure PLD 410 in accordance with an embodiment of the disclosure. In particular, secure boot process 1200 illustrates a golden image secure boot process (e.g., secure PLD 410 configured according to a "golden boot mode") and secure boot process 1202 illustrates a ping pong image secure boot process (e.g., secure PLD 410 configured according to a "ping pong boot mode").

In the embodiment illustrated in FIG. 12A, golden image secure boot process 1200 includes a configuration image update process that shows both an update failure process 1210 and an update success process 1212. In golden image secure boot process 1200, configuration image B is booted because its pre-authentication status is valid and because it isn't the golden configuration image (e.g., generally configuration image B postdates or includes additional functionality relative to the golden configuration image). In update failure process 1210, configuration image C is received and written to NVM 450 (e.g., over configuration image B), but pre-authentication process 1120 fails, and so configuration engine 440 retrieves the golden configuration image and boots PLD fabric 400 accordingly. Subsequently, configuration image D is written over invalid configuration image C, and pre-authentication process 1120 succeeds (e.g., configuration image D is determined to have a valid pre-authentication status). Configuration engine 440 then boots PLD fabric 400 according to valid configuration image D.

In the embodiment illustrated in FIG. 12B, ping pong image secure boot process 1202 includes a configuration image update process that shows both an update failure process 1220 and an update success process 1222. In ping pong image secure boot process 1202, configuration image B is booted because its pre-authentication status is valid and because its design version postdates configuration image A. In update failure process 1220, configuration image C is received and written to NVM 450 (e.g., over configuration image B) and given a default design version number (e.g., to indicate it is not pre-authenticated and to ensure it proceeds through pre-authentication), but pre-authentication process 1120 fails, and so configuration engine 440 retrieves valid configuration image A and boots PLD fabric 400 accordingly. Subsequently, configuration image D is written over invalid configuration image C (and again given the default design version number), pre-authentication process 1120 succeeds (e.g., configuration image D is determined to have a valid pre-authentication status), and configuration image D is given a non-default design version number (e.g., which is equal to or postdates that for configuration image B). Configuration engine 440 then boots PLD fabric 400 according to valid and most recently updated configuration image D.

In general, a golden configuration image is used as a sacrosanct backup for PLD fabric 400, and update configuration images can only be stored in other areas of NVM 450. Either configuration image in a ping pong boot mode may be updated based on a last booted image, a least recent date, and/or according to a variety of rules depending on a customer desire or need. In some embodiments, secure PLD 410 may initially be in a ping pong boot mode, and configuration engine 440 may be configured to select one configuration image stored in NVM 450 and/or received over configuration I/O 448 and/or programmable I/O 404 as a golden configuration image and place secure PLD 410 in a golden boot mode. Similarly, configuration engine 440 may be configured to change the status of a golden configuration image in NVM 440 to an updateable configuration image and place secure PLD 410 in a ping pong boot mode. In further embodiments, NVM 450 may be configured with sufficient capacity to implement gold boot and/or ping pong boot modes with more than two configuration images.

In various embodiments, design version numbers for configuration images may be configured simply to differentiate configuration images from each other (e.g., A from B), which may only require 1 or two bits of information. In other embodiments, design version numbers may be configured to identify a version date, serial number, and/or other configuration image identification information, for example, and may be implemented with 3 or more bits, as needed. Such design versions may be used in combination with one or more rollback protection rulesets, such as during pre-authentication process 1120, to help protect secure PLD 410 from known vulnerable configuration images, as described herein.

For example, FIG. 13 illustrates rollback protection rulesets 1300 for a secure boot process for secure PLD 410 in accordance with an embodiment of the disclosure. In various embodiments, configuration engine 440 may be configured to compare a design version corresponding to a non-pre-authenticated configuration image to the design version corresponding to a pre-authenticated and valid configuration image stored in NVM 450, or to a set of blacklisted design versions, according to a rollback protection ruleset stored in NVM 450 and/or integrated with a pre-authenticated and valid configuration image stored in NVM 450.

In FIG. 13, rollback protection rulesets 1300 indicate how various configuration images are validated and invalidated during an attempted update as part of pre-authentication process 1120 based on their individual design version, the design versions of configuration images stored in NVM 450, the particular boot mode for secure PLD 440, and the various rules illustrated in rollback protection rulesets 1300. For example, in an embodiment where secure PLD 440 is in a golden boot mode (e.g., top row), a rollback ruleset requiring only that the design version of the update configuration image B be greater than or equal to the design version of the golden configuration image A (e.g., second column) results in the indicated validated updates (e.g., configuration images with design versions 16 or 11). A rule-based ruleset might include a user defined minimum design version (e.g., the third column). The middle row shows example rollback rulesets for secure PLD 440 in a ping pong boot mode (e.g., with internal configuration images stored in NVM 450), and the bottom row shows example rollback rulesets for secure PLD 440 configured to boot off an internal or external configuration image.

In addition to the Boolean operations identified in rollback protection rulesets 1300, such rollback protection rulesets may include blacklisted design versions (e.g., design version!=blacklisted design version 1, or versions 1-5, etc.). Configuration engine 440 may be configured to only set a pre-authentication status to a valid status if the tested configuration image is validated based on its design version and such rollback protection rulesets. In some embodiments, a design version may be a monotonically increasing unsigned integer selected by secure PLD customer 510 or secure PLD manufacturer 520, for example, and/or a date code, integrated with a configuration image. A rollback protection ruleset may also be integrated with a configuration image in order to update the applicable rollback protection ruleset(s). For external configuration image updating, configuration engine 440 may be configured to treat an internal configuration image as a golden image and use a rollback protection ruleset for updating one or more external configuration images, or if there are no internal configuration images, to simply use the rollback protection ruleset for updating the one or more external configuration images.

Figure 14:
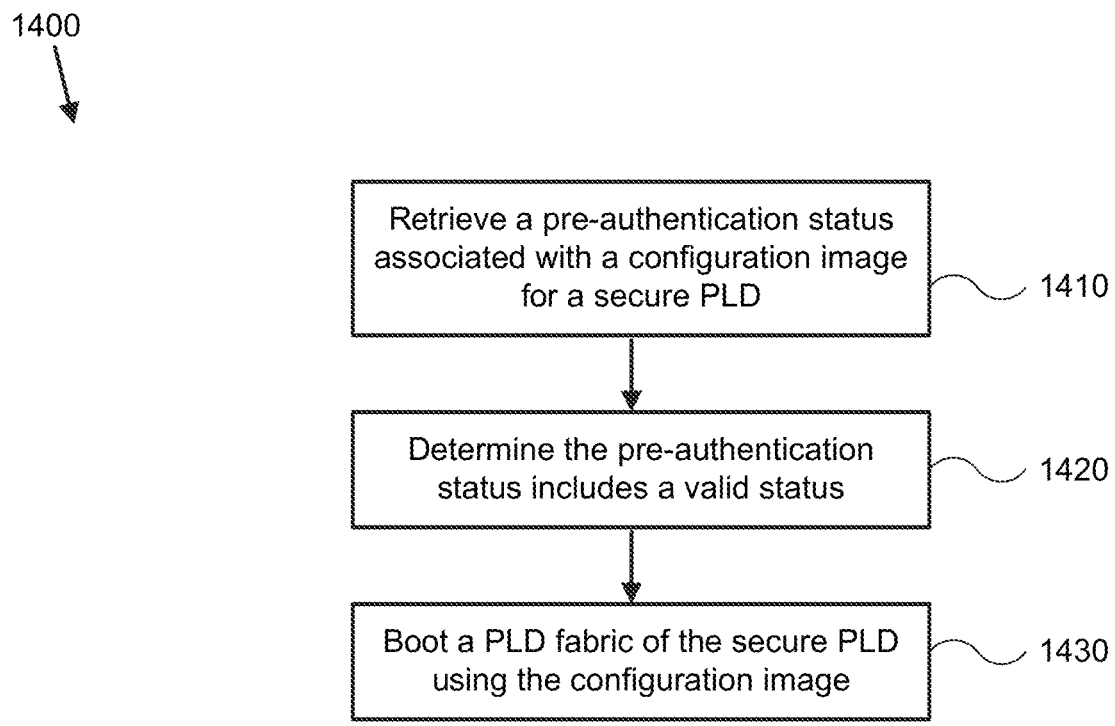
FIG. 14 illustrates a secure boot process for a secure PLD in accordance with an embodiment of the disclosure.

FIG. 14 illustrates a secure boot process 1400 for secure PLD 410 in accordance with an embodiment of the disclosure. In some embodiments, the operations of FIG. 14 may be implemented as software instructions executed by one or more logic devices associated with corresponding electronic devices, modules, processes, and/or structures depicted in FIGS. 1-13. More generally, the operations of FIG. 14 may be implemented with any combination of software instructions and/or electronic hardware (e.g., inductors, capacitors, amplifiers, actuators, or other analog and/or digital components). It should be appreciated that any step, sub-step, sub-process, or block of process 1400 may be performed in an order or arrangement different from the embodiments illustrated by FIG. 14. For example, in other embodiments, one or more blocks may be omitted from process 1400, and other blocks may be included. Furthermore, block inputs, block outputs, various sensor signals, sensor information, calibration parameters, and/or other operational parameters may be stored to one or more memories prior to moving to a following portion of process 1400. Although process 1400 is described with reference to systems, devices, processes, and elements of FIGS. 1-13, process 1400 may be performed by other systems, devices, and elements, and including a different selection of electronic systems, devices, elements, assemblies, and/or arrangements. At the initiation of process 1400, various system parameters may be populated by prior execution of a process similar to process 1400, for example, or may be initialized to zero and/or one or more values corresponding to typical, stored, and/or learned values derived from past operation of process 1400, as described herein.

In block 1410, a logic device retrieves a pre-authentication status associated with a configuration image for a secure PLD. For example, configuration engine 440 of secure PLD 410 may be configured to retrieve a pre-authentication status (e.g., stored in other securable storage sectors 464 of NVM 450) associated with configuration image 0 in sector 452 or configuration image 1 in sector 454 of NVM 450, either of which may be used to program PLD fabric 400 of secure PLD 410. In other embodiments, configuration engine 440 may be configured to retrieve a pre-authentication status associated with a configuration image stored on external medium 136 and provided over configuration I/O 448 and/or programmable I/O 404.

Prior to such retrieval, configuration engine 440 may be configured to perform pre-authentication process 1120 associated with the configuration image for secure PLD 410 to determine the pre-authentication status associated with the configuration image retrieved in block 1410. In various embodiments, such pre-authentication process may include determining an authentication engine result based, at least in part, on the configuration image, determining a design version corresponding to the configuration image and/or a pre-authentication digest or hash signature associated with the configuration image, and storing the authentication engine result, the design version corresponding to the configuration image, and/or the pre-authentication digest or hash signature as the pre-authentication status in NVM 450. In some embodiments, such pre-authentication process may include determining an authentication engine result based, at least in part, on the configuration image, and selectively storing the authentication engine result as the pre-authentication status in the NVM based, at least in part, on the authentication engine result.

In various embodiments, an authentication engine may be implemented by and/or within configuration engine 440, security engine 420, and/or a combination of those and/or including other IC modules 480. An authentication engine may be configured to authenticate the configuration image, such as where the configuration image is signed using a private key associated with secure PLD customer 510 for secure PLD 410 or secure PLD manufacturer 520 of secure PLD 410, a corresponding public key is stored in NVM 450, and where the authenticating includes using the public key to verify that the configuration image is signed using the private key associated with secure PLD customer 510 or secure PLD manufacturer 520. An authentication engine may be configured to determine the configuration image includes a complete configuration image for secure PLD 410, such as by comparing a size of the configuration image to a corresponding expected size or checksum, for example. An authentication engine may be configured to validate the configuration image with respect to secure PLD 410, which may include design version comparisons to rollback protection rulesets and/or other configuration images, functionality comparisons, serial number, device ID, and/or other comparisons, for example. In such embodiments, the authentication engine may be configured to provide a pass result when all such checks are passed, for example, and to provide a fail result when any of such checks fail. In general, such design version comparisons and/or validation may be performed by an authentication engine or may be performed as part of pre-authentication process 1120.

In one embodiment, secure PLD 410 may be configured to authenticate a configuration image signed by an application or other private key using an application or other public key stored in NVM 450 during a locking, programming, or other provisioning step in a provisioning process, as described herein. In another embodiment, secure PLD 410 may be configured to authenticate such configuration image by comparing a secure PLD trace ID in the configuration image with a trace ID stored in MFG trim sector 456 and/or other sector of NVM 450 or with device ID 422 of security engine 420, such that a matching trace ID in the configuration image indicates an authenticated configuration image. In further embodiments, such authentication process may include decrypting the configuration image using a public key stored in NVM 450, as described herein.

In block 1420, a logic device determines a pre-authentication status includes a valid status. For example, configuration engine 440 of secure PLD 410 may be configured to determine an authentication engine result associated with the configuration image comprises a pass result and/or determine or compute a pre-boot digest or hash signature associated with the configuration image and verify that the computed pre-boot hash signature matches a pre-authentication digest or hash signature (e.g., generated by pre-authentication process 1120) prior to booting PLD fabric 400 using the configuration image, where the pre-authentication status includes the pre-authentication hash signature associated with the configuration image.

In block 1430, a logic device boots a PLD fabric of a secure PLD using a configuration image. For example, configuration engine 440 of secure PLD 410 may be configured to retrieve configuration image 0 from NVM 450, program PLD fabric 400 according to configuration image 0, and initialize or wake up PLD fabric 400 of secure PLD 410. Upon booting configuration image 0, PLD fabric 400 may be configured to set or update device keys lock status 858 to allow write and/or erase access to device keys sector 458 and/or UFM sector 462, to download/receive new keys through a secure channel (e.g., established by PLD fabric 400 over programmable I/O 404), to write the new keys to UFM sector 462, to erase device keys sector 458, to copy the new keys from UFM sector 462 into device keys sector 458, to download an update configuration image for PLD fabric 400, to decrypt and/or authenticate the update configuration image using the new keys, and to store the update configuration image in one of configuration image sectors 452 or 454 (and including setting the authentication bit to indicate the stored update configuration image is bootable without necessitating another authentication process) and/or boot the update configuration image. In various embodiments, device keys lock status 858 may be updated to include a write disable and/or an erase disable lock status as against configuration I/O 448 and/or PLD fabric 400. Such process allows embodiments to update keys and configuration images securely as part of a single or unified methodology.

In another embodiment, configuration engine 440 and/or PLD fabric 400 may be configured to receive, validate, and/or authenticate an unlock request for a particular configuration image sector, and to unlock the particular configuration image sector for programming by external system 130 and/or by PLD fabric 400 according to an updated configuration image provided by external system 130. Configuration engine 440 and/or PLD fabric 400 may also be configured to receive a lock request (e.g., identifying the updated configuration image stored in configuration image sector 454) from external system 130 over configuration I/O 448 and through configuration engine 440, and configuration engine 440 and/or PLD fabric 400 may be configured to receive, validate, and/or authenticate the lock request, and to hard or soft lock configuration image sector 454 against further external access, as described herein.

Figure 15:
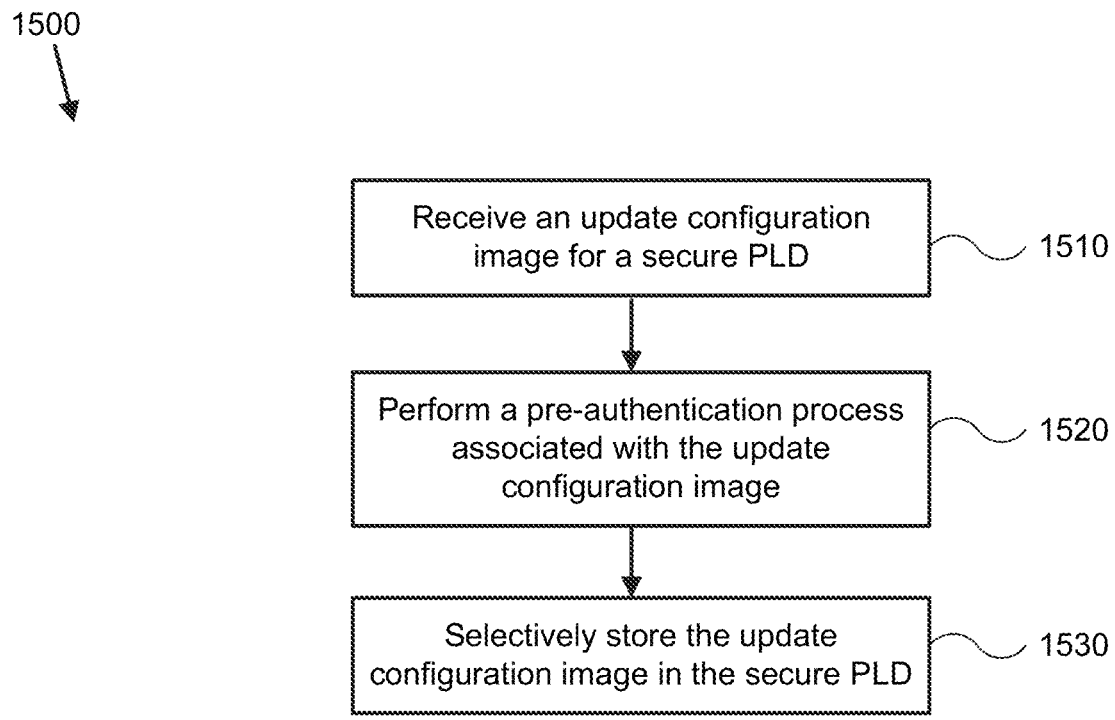
FIG. 15 illustrates a secure boot process for a secure PLD in accordance with an embodiment of the disclosure.

FIG. 15 illustrates a secure boot process 1500 for secure PLD 410 in accordance with an embodiment of the disclosure. In some embodiments, the operations of FIG. 15 may be implemented as software instructions executed by one or more logic devices associated with corresponding electronic devices, modules, processes, and/or structures depicted in FIGS. 1-14. More generally, the operations of FIG. 15 may be implemented with any combination of software instructions and/or electronic hardware (e.g., inductors, capacitors, amplifiers, actuators, or other analog and/or digital components). It should be appreciated that any step, sub-step, sub-process, or block of process 1500 may be performed in an order or arrangement different from the embodiments illustrated by FIG. 15. For example, in other embodiments, one or more blocks may be omitted from process 1500, and other blocks may be included. Furthermore, block inputs, block outputs, various sensor signals, sensor information, calibration parameters, and/or other operational parameters may be stored to one or more memories prior to moving to a following portion of process 1500. Although process 1500 is described with reference to systems, devices, processes, and elements of FIGS. 1-14, process 1500 may be performed by other systems, devices, and elements, and including a different selection of electronic systems, devices, elements, assemblies, and/or arrangements. At the initiation of process 1500, various system parameters may be populated by prior execution of a process similar to process 1500, for example, or may be initialized to zero and/or one or more values corresponding to typical, stored, and/or learned values derived from past operation of process 1500, as described herein.

In block 1510, a logic device receives an update configuration image for a secure PLD. For example, configuration engine 440 of secure PLD 410 may be configured to receive an update configuration image over configuration I/O 448 or programmable I/O 404 of secure PLD 410, in an attempt to update either configuration image 0 or 1 in NVM 450. In some embodiments, configuration engine 440 may be configured to receive an update configuration image issued by an external system 130 of secure PLD customer 510 or secure PLD manufacturer 520 coupled to secure PLD 410 over configuration I/O 448, for example, or issued by PLD fabric 400 running a customer or manufacturer configuration programmed into secure PLD 410.

In block 1520, a logic device performs a pre-authentication process associated with an update configuration image. For example, configuration engine 440 of secure PLD 410 may be configured to perform pre-authentication process 1120 associated with the update configuration image to determine a pre-authentication status associated with the update configuration image. In some embodiments, performing pre-authentication process 1120 may include determining an authentication engine result based, at least in part, on the update configuration image, and selectively storing the authentication engine result as the pre-authentication status in NVM 450 based, at least in part, on the authentication engine result. For example, if the authentication engine result comprises a pass result, configuration engine 440 may be configured to store the pass result as a valid status associated with pre-authentication process 1120 and/or the received update configuration image. If the authentication engine result comprises a fail result, configuration engine 440 may be configured to omit the pre-authentication status or store the fail result as an invalid status associated with pre-authentication process 1120 and/or the received update configuration image.

In additional embodiments, performing pre-authentication process 1120 may include determining a design version corresponding to the received update configuration image and selectively validating the design version corresponding to the update configuration image based, at least in part, on rollback protection ruleset 1300 stored in NVM 450, a secure boot mode associated with secure PLD 410, and/or first and/or second design versions corresponding to respective first and/or second configuration images (e.g., configuration images 0 and 1) stored in NVM 450.

In block 1530, a logic device selectively stores an update configuration image in a secure PLD. For example, configuration engine 440 of secure PLD 410 may be configured to selectively store the update configuration image in NVM 450 in place of a first or second configuration image (e.g., configuration images 0 or 1) based, at least in part, on the pre-authentication status determined in block 1520 and a secure boot mode associated with secure PLD 410. For example, if the pre-authentication status associated with the update configuration image comprises a valid status, configuration engine 440 may be configured to store the update configuration image in NVM 450 (e.g., over configuration 0 or 1) based, at least in part, on a design version identified in the pre-authentication status and a golden boot mode or a ping pong boot mode associated with secure PLD 410. In embodiments where the secure boot mode associated with secure PLD 410 comprises a golden boot mode, the storing the update configuration image in NVM 450 may include identifying a first configuration image (e.g., configuration 0) as a golden configuration image and storing the update configuration image in NVM 450 in place of a second configuration image (e.g., in place of configuration 1). In embodiments where the secure boot mode associated with secure PLD 410 comprises a ping pong boot mode, the storing the update configuration image in NVM 450 may include identifying a second configuration image (e.g., configuration 1) as an updateable configuration image and storing the update configuration image in NVM 450 in place of the second configuration image (e.g., in place of configuration 1).

If the pre-authentication status associated with the update configuration image comprises an invalid status, configuration engine 440 may be configured to erase the update configuration image or set related sectors in NVM 450 to write and/or erase enabled. In various embodiments, once configuration engine 440 overwrites configuration 0 or 1 with the update configuration image received in block 1510, configuration engine 440 may proceed with a fast secure boot process similar to process 1400 of FIG. 14, including retrieving the pre-authentication status associated with the update configuration image from NVM 450, verifying the retrieved pre-authentication status associated with the configuration image comprises a valid status, and booting PLD fabric 400 of secure PLD 410 using the update configuration image. Such booting of PLD fabric 400 may include retrieving the update configuration image from NVM 450, programming PLD fabric 400 according to the update configuration image and initializing PLD fabric 400 of secure PLD 410.

Thus, by employing the systems and methods described herein, embodiments of the present disclosure are able to provide flexible and secure booting for a secure PLD. A customer locked and/or otherwise provisioned secure PLD may be securely booted and/or updated without risking exposure of customer data and without incurring substantial downtime or repeated degraded performance associated with repetitive authentication of the same configuration image at boot time.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A secure programmable logic device (PLD) secure booting system, comprising:
a secure PLD, wherein the secure PLD comprises a plurality of programmable logic blocks (PLBs) arranged in a PLD fabric of the secure PLD, and a configuration engine configured to program the PLD fabric according to a first configuration image stored in a non-volatile memory (NVM) of the secure PLD and/or coupled through a configuration input/output (I/O) of the secure PLD to the configuration engine, wherein the secure PLD is configured to perform a computer-implemented method comprising:
retrieving a first pre-authentication status associated with the first configuration image from the NVM;
determining the first retrieved pre-authentication status associated with the first configuration image is valid;
booting the PLD fabric of the secure PLD using the first configuration image;
receiving an update configuration image over the configuration I/O or a programmable I/O of the secure PLD;
performing an update pre-authentication process associated with the update configuration image to determine an update pre-authentication status associated with the update configuration image;
selectively storing the update configuration image in the NVM in place of the first configuration image if the update pre-authentication status associated with the update configuration image is valid; and
booting the PLD fabric of the secure PLD using the stored update configuration image without requiring performance of an additional authentication process for the stored update configuration image.

2. The secure PLD secure booting system of claim 1, wherein the computer-implemented method further comprises performing a first pre-authentication process associated with the first configuration image prior to the retrieving the first pre-authentication status associated with the first configuration image, the pre-authentication process comprising:

determining an authentication engine result comprises a pass result based, at least in part, on the first configuration image;

determining a design version corresponding to the first configuration image and/or a pre-authentication hash signature associated with the first configuration image; and storing the authentication engine result, the design version corresponding to the first configuration image, and/or the pre-authentication hash signature as the first pre-authentication status in the NVM.

3. The secure PLD secure booting system of claim 2, wherein the determining the authentication engine result comprises a pass result comprises:

authenticating the first configuration image, wherein the first configuration image is signed using a private key associated with a secure PLD customer for the secure PLD or a secure PLD manufacturer of the secure PLD, a corresponding public key is stored in the NVM, and the authenticating comprises using the public key to verify that the first configuration image is signed using the private key associated with the secure PLD customer or the secure PLD manufacturer;

determining the first configuration image comprises a complete configuration image for the secure PLD; and/or validating the first configuration image with respect to the secure PLD.

4. The secure PLD secure booting system of claim 1, wherein the determining the pre-authentication status associated with the first configuration image comprises a first valid status comprises:

determining an authentication engine result associated with the first configuration image comprises a pass result; and/or determining a pre-boot hash signature associated with the first configuration image and verifying that the pre-boot hash signature matches a pre-authentication hash signature prior to the booting the PLD fabric using the first configuration image, wherein the first pre-authentication status comprises the pre-authentication hash signature associated with the first configuration image.

5. The secure PLD secure booting system of claim 1, wherein a secure boot mode is associated with the secure PLD.

6. The secure PLD secure booting system of claim 5, wherein the performing the update pre-authentication process associated with the update configuration image comprises:

determining a design version corresponding to the update configuration image; and validating the design version corresponding to the update configuration image based, at least in part, on a rollback protection ruleset stored in the NVM, the secure boot mode associated with the secure PLD, and/or first and/or update design versions corresponding to the respective first and/or update configuration images.

7. The secure PLD secure booting system of claim 5, wherein the secure boot mode associated with the secure PLD comprises a golden boot mode.

8. The secure PLD secure booting system of claim 5, wherein the secure boot mode associated with the secure PLD comprises a ping pong boot mode, and wherein the selectively storing the update configuration image in the NVM comprises:

identifying the first configuration image as an updateable configuration image.

9. A secure programmable logic device (PLD) secure booting system, comprising:

a secure PLD, wherein the secure PLD comprises a plurality of programmable logic blocks (PLBs) arranged in a PLD fabric of the secure PLD, and a configuration engine configured to program the PLD fabric according to a first configuration image stored in a non-volatile memory (NVM) of the secure PLD and/or coupled through a configuration input/output (I/O) of the secure PLD to the configuration engine, wherein the secure PLD is configured to perform a computer-implemented method comprising:

receiving an update configuration image over the configuration I/O or a programmable I/O of the secure PLD;

performing an update pre-authentication process associated with the update configuration image to determine a pre-authentication status associated with the update configuration image;

selectively storing the update configuration image in the NVM in place of the first configuration image if the update pre-authentication status associated with the update configuration image is valid; and booting the PLD fabric of the secure PLD using the stored update configuration image without requiring performance of an additional authentication process for the stored update configuration image.

10. The secure PLD secure booting system of claim 9, wherein the performing the update pre-authentication process associated with the update configuration image comprises:

determining an authentication engine result based, at least in part, on the update configuration image; and selectively storing the authentication engine result as the pre-authentication status in the NVM based, at least in part, on the authentication engine result.

11. The secure PLD secure booting system of claim 9, wherein the performing the update pre-authentication process associated with the update configuration image comprises:

determining a design version corresponding to the update configuration image; and selectively validating the design version corresponding to the update configuration image based, at least in part, on a rollback protection ruleset stored in the NVM, a secure boot mode associated with the secure PLD, and/or first and/or update design versions corresponding to the respective first and/or update configuration images.

12. The secure PLD secure booting system of claim 9, wherein the computer-implemented method further comprises:

retrieving the update pre-authentication status associated with the update configuration image from the NVM; and verifying the retrieved update pre-authentication status associated with the update configuration image comprises a valid status.

13. The secure PLD secure booting system of claim 12, wherein the booting the PLD fabric of the secure PLD comprises:

retrieving the stored update configuration image from the NVM;

programming the PLD fabric according to the stored update configuration image; and initializing the PLD fabric of the secure PLD.

14. A method for secure booting for a secure programmable logic device (PLD), the method comprising:
retrieving a first pre-authentication status associated with a first configuration image for a PLD fabric of the secure PLD, from a non-volatile memory (NVM) of the secure PLD, wherein the first configuration image is stored in the NVM and/or coupled through a configuration input/output (I/O) of the secure PLD to the secure PLD;
determining the retrieved first pre-authentication status associated with the first configuration image is valid;
booting the PLD fabric of the secure PLD using the first configuration image;
receiving an update configuration image over the configuration I/O or a programmable I/O of the secure PLD;
performing an update pre-authentication process associated with the update configuration image to determine an update pre-authentication status associated with the update configuration image;
selectively storing the update configuration image in the NVM in place of the first configuration image if the pre-authentication status associated with the update configuration image is valid; and
booting the PLD fabric of the secure PLD using the stored update configuration image without requiring performance of an additional authentication process for the stored update configuration image.

15. The method of claim 14, further comprising performing a first pre-authentication process associated with the first configuration image prior to the retrieving the first pre-authentication status associated with the first configuration image, the first pre-authentication process comprising:
determining an authentication engine result comprises a pass result based, at least in part, on the first configuration image;
determining a design version corresponding to the first configuration image and/or a pre-authentication hash signature associated with the first configuration image; and
storing the authentication engine result, the design version corresponding to the first configuration image, and/or the pre-authentication hash signature as the first pre-authentication status in the NVM.

16. The method of claim 15, wherein the determining the authentication engine result comprises a pass result comprises:
authenticating the first configuration image, wherein the first configuration image is signed using a private key associated with a secure PLD customer for the secure PLD or a secure PLD manufacturer of the secure PLD, a corresponding public key is stored in the NVM, and the authenticating comprises using the public key to verify that the first configuration image is signed using the private key associated with the secure PLD customer or the secure PLD manufacturer;
determining the first configuration image comprises a complete configuration image for the secure PLD; and/or
validating the first configuration image with respect to the secure PLD.

17. The method of claim 14, wherein the determining the first pre-authentication status associated with the first configuration image is valid comprises:
determining an authentication engine result associated with the first configuration image comprises a pass result; and/or
determining a pre-boot hash signature associated with the first configuration image and verifying that the pre-boot hash signature matches a pre-authentication hash signature prior to the booting the PLD fabric using the first configuration image, wherein the first pre-authentication status comprises the pre-authentication hash signature associated with the first configuration image.

18. The method of claim 14, wherein a secure boot mode is associated with the secure PLD.

19. The method of claim 18, wherein the performing the update pre-authentication process associated with the update configuration image comprises:
determining a design version corresponding to the update configuration image; and
validating the design version corresponding to the update configuration image based, at least in part, on a rollback protection ruleset stored in the NVM, the secure boot mode associated with the secure PLD, and/or first and/or update design versions corresponding to the respective first and/or update configuration images.

20. The method of claim 18, wherein the secure boot mode associated with the secure PLD comprises a golden boot mode.

21. The method of claim 18, wherein the secure boot mode associated with the secure PLD comprises a ping pong boot mode, and wherein the selectively storing the update configuration image in the NVM comprises:
identifying the first configuration image as an updateable configuration image.

* * * * *